United States Patent [19]
Lichtash et al.

[11] Patent Number: 5,193,087
[45] Date of Patent: Mar. 9, 1993

[54] ELECTRONIC DIGITAL CROSS-CONNECT SYSTEM HAVING BIPOLAR VIOLATION TRANSPARENCY

[75] Inventors: Avi Lichtash, Ramat-Hasharon; Israel Vitelson; Zvi Huna, both of Givati'im; Reuven Markus, Petach-Tikva; Michal Nosatzki, Rishon Lezion; Baruch Gutman, Bnei-Brak; Shlomo Orbach, Haifa; Rafi Taler, Yavne; Yossi Moshe, Hertzlia; Leon Bruckman, Petach-Tikva; Gideon Agmon, Tel-Aviv, all of Israel

[73] Assignee: Tadiran, Ltd., Petah-Tikya, Israel

[21] Appl. No.: 524,930

[22] Filed: May 18, 1990

Related U.S. Application Data

[63] Continuation-in-part of Ser. No. 524,003, May 16, 1990, abandoned.

[51] Int. Cl.$^5$ .................. H04Q 11/04; H03K 7/08; H04L 25/34
[52] U.S. Cl. ................. 370/58.2; 370/65.5; 375/17; 375/22
[58] Field of Search ............ 370/9, 53, 58.1–58.3, 370/59, 63, 65, 65, 5, 77, 78, 100.1, 105.3; 375/17, 20, 22, 81, 118–120; 340/825.79, 825.85; 341/53, 56, 57; 329/312; 332/107, 109; 379/281, 291, 292, 306, 335; 455/600, 608

[56] References Cited

U.S. PATENT DOCUMENTS

| | | | |
|---|---|---|---|
| 3,141,067 | 7/1964 | Spandorfer | 340/825.85 |
| 3,573,384 | 4/1971 | Konidaris et al. | 340/825.85 |
| 3,949,199 | 4/1976 | Odom | 375/22 |
| 4,001,578 | 1/1977 | Cook et al. | 341/57 |
| 4,114,143 | 9/1978 | Karnaugh | 370/65.5 |
| 4,450,556 | 5/1984 | Boleda et al. | 370/58.2 |
| 4,567,601 | 1/1986 | Mountain | 375/22 |
| 4,667,320 | 5/1987 | Onno et al. | 370/65.5 |
| 4,852,124 | 7/1989 | Raucci | 375/120 |
| 4,962,509 | 10/1990 | Itoh | 375/17 |

Primary Examiner—Benedict V. Safourek
Assistant Examiner—Alpus H. Hsu
Attorney, Agent, or Firm—Antonelli, Terry, Stout & Kraus

[57] ABSTRACT

An electronic digital signal cross-connect system (EDSX) is provided which includes a plurality of input terminals for respectively receiving bipolar 3-level input signals having a predetermined bit rate, and a plurality of output terminals for respectively providing bipolar 3-level output signals having the same predetermined bit rate. An interface circuit is provided which has an input section coupled to the input terminals to receive the bipolar 3-level input signals and an output section coupled to the output terminals to output the bipolar 3-level output signals. The input section of the interface circuit is constructed to include converting circuitry for converting the bipolar 3-level input signals into predetermined coded signals. Correspondingly, the output section of the interface circuit includes converting circuitry for decoding the predetermined coded signals into bipolar 3-level output signals. A switching matrix having a plurality of switching units is arranged between the input section and output section of the interface circuit. A control unit is coupled to the switching matrix to control the switching units in a manner to couple predetermined ones of the inputs of the switching matrix to predetermined ones of the outputs of the switching matrix. By virtue of this control of the switching units of the switching matrix, the cross-connection between input terminals receiving bipolar 3-level input signals and output terminals providing bipolar 3-level output signals is controlled. Further, by virtue of the coding arrangement used in the present invention, the EDSX is transparent to any bipolar violations which may exist in the bipolar 3-level input signals.

8 Claims, 33 Drawing Sheets

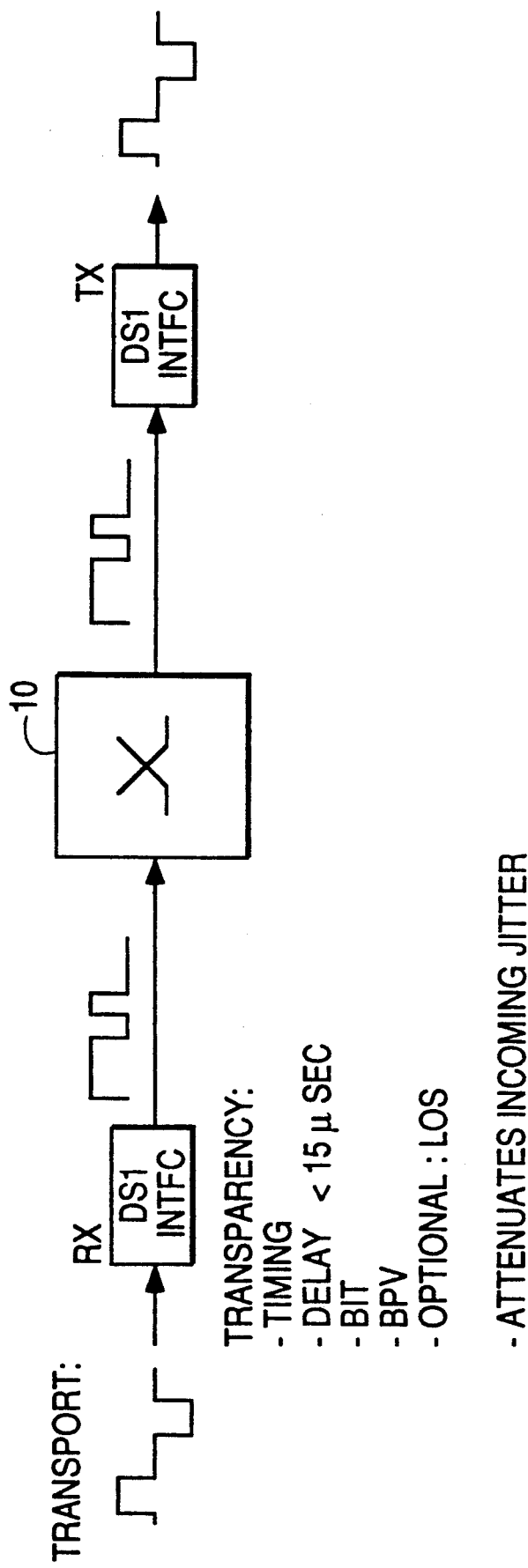

P. M. :
- LINE CODES : AMI, B8ZS
- FRAME FORMATS : SF, ESF, OTHER
- QRSS : FRAMED/UNFRAMED
- BPV
- LOS

DS1 MAINTENANCE :
- AIS
- QRSS UNFRAMED
- IN-BAND, REPETITIVE CODES

SWITCHING NETWORK
RELIABILITY:
n + 1 PROTECTION

ELECTRONIC DIGITAL CROSS-CONNECT SYSTEM HAVING BIPOLAR VIOLATION TRANSPARENCY

This application is a continuation-in-part application of U.S. application Ser. No. 07/524,003 by Avi Lichtash et al filed May 16, 1990, entitled "Electronic Digital Cross-Connect System Having Bipolar Violation Transparency" now abandoned.

BACKGROUND OF THE INVENTION

This invention relates generally to an improved cross-connect system for digital telecommunication systems, and, more particularly, to an electronic digital signal cross-connect system (hereinafter EDSX) which can serve as a direct replacement for conversational manual digital signal cross-connect systems (hereinafter (DSX), and which includes built-in expanded features such as performance monitoring and test access which are not available with such conversational manual DSX.

A conversational manual DSX system is shown in FIG. 1 in conjunction with various telephone communication equipment which such manual DSX systems are customarily connected to (e.g. electronic switching systems such as 5ESS, channel banks, subscriber loops, office repeater bays, etc.). Such manual DSX systems are presently found in virtually every telephone central office in the United States. Present DSX-1 systems receive DS1 signals at the DS1 level (1.544 MBPS) and mechanically cross-connect the signals in a wired array to distribute the signals to other offices or long distance carriers. If changes have to be made in the connection, these are temporarily done by plugs and jacks, until re-wiring can be carried out. Obviously, it is desirable to develop an electronic way to achieve this distribution.

FIG. 2 shows a digital cross-connect system (DCS-3/1) which has been developed by various companies such as AT&T, NEC and Rockwell to try to enhance the operation of the conventional mechanical DSX. These systems receive signals at the DS3 level (45 MBPS), and demultiplex these to a DS1 level for processing. In processing direct DS1 inputs, these systems convert the signals to a binary level (from the bipolar 3-level DS1 signals having +, 0 and − levels) thereby losing the bipolar information. These systems have significantly more delay than the mechanical DSX system (which has almost no delay because of the fact that it is a simple wired connecting arrangement). If a number of these DCS-3/1 systems are used together, the delay becomes intolerable, and an echo canceller must be used (at significant added cost). It should be noted that basically these systems operate as time and space switching arrays.

Although such DCS systems are capable of handling very large volumes, they do not solve the problem of providing a direct electronic substitute for the conversational manual DSX. For one thing, as noted above, the DCS systems employ time and space switch arrays which cause significant delays in the signal processing. The manual DSX, on the other hand, has virtually no delays at all in cross-connecting various signal lines. Accordingly, the DCS systems cannot serve as direct transparent replacements for the manual DSX systems because of the greater delay which they bring about.

In addition to the delay found in DCS systems, they also suffer from another problem which prevents them from satisfactorily serving as a direct transparent replacement for manual DSX. Specifically, DCS systems currently in use are not transparent to bipolar violations. An explanation of this shortcoming is provided below.

As referred to above, DS1 signals are conventionally formed as bipolar AMI (alternate mark inversion) 3-level signals which are pseudoternary signals, conveying binary digits, in which successive "ones" (marks, pulses) are of alternating, positive (+) and negative (−) polarity, equal in amplitude, and in which a "zero" (space, no pulse) is of zero amplitude. At times, deliberate violations are made of the AMI code, for example to test the overall communication system to ensure proper function. These are customarily referred to as bipolar violations and occur when a one (mark, pulse) has the same polarity as its predecessor. A conventional manual DSX system is transparent to such bipolar violations, so that any intentional bipolar violation will be the same at the output of the manual DSX as it is at the input thereof. However, because the DCS system breaks down the bipolar 3-level signals to a simple 2 level digital signal for faster and simpler proceeding, such bipolar violations are lost. In other words, a deliberate bipolar violation at the input of a DCS system will not show up as a bipolar violation at the output thereof. Accordingly, DCS system are incapable of bipolar violation transparency which is available in manual DSX systems.

Although manual DSX systems have the advantage of virtually no delay and bipolar violation transparency, they do, of source, suffer from a number of serious drawbacks. As noted above, they require re-wiring whenever a cross-connection change is to be made. This, of source, is extremely cumbersome. In addition to this, manual DSX cannot be electronically controlled from the outside by either craft interface terminals (CIT) or external operating systems (OS). Further, there is no provision in conversational manual DSX for built-in performance monitoring. Accordingly, it would be highly desirable to provide an EDSX which is capable of electronically changing the cross-connections, and which is also capable of the above-noted functions which the manual DSX is incapable of, while still maintaining the desirable features of virtually no delay and bipolar violation transparency.

SUMMARY OF THE INVENTION

It is, accordingly, an object of the present invention to provide an EDSX which is capable of serving as a direct transparent replacement for a conventional manual DSX.

Another object of the present invention is to provide an EDSX which is transparent to bipolar violations in the bipolar 3-level input signals.

It is a further object of the present invention to provide an EDSX which can be directly controlled from outside of the EDSX system by either a CIT or an external OS.

Another object of the present invention is to provide an EDSX which has built-in performance monitoring.

Yet another object of the present invention is to provide an EDSX which is capable of attenuating jitter in the system.

To achieve these and other objects, the present invention provides an EDSX which includes a plurality of input terminals for respectively receiving bipolar 3-level input signals having a predetermined bit rate, and a plurality of output terminals for respectively providing bipolar 3-lever output signals having the same predetermined bit rate. The output terminals serve as the outputs for the cross-connect system. An interface circuit is provided which has an input section coupled to the input terminals to receive the bipolar 3-level input signals. The interface circuit also has an output section coupled to the output terminals to output the bipolar 3-level output signals.

A particular feature of the present invention is the construction of the input section of the interface circuit to include an arrangement for converting the bipolar 3-level input signals into predetermined coded signals. Correspondingly, the output section of the interface circuit includes converting circuitry for decoding the predetermined coded signals into bipolar 3-level output signals. A switching matrix is arranged between the input section and output section of the interface circuit. The switching matrix accordingly receives the predetermined coded signals from the input section of the interface circuit and provides predetermined coded signals to the output section of the interface circuit. The switching matrix includes a plurality of switching units which serve to couple predetermined inputs of the switching matrix to predetermined outputs thereof.

A control unit is coupled to the switching matrix to control the switching units in a manner to couple predetermined ones of the inputs of the switching matrix to predetermined ones of the outputs of the switching matrix. As such, the control unit serves to control the connection paths through the switching matrix. Inasmuch as the control unit can be controlled externally, this permits changing the cross-connection coupling through the switching matrix by external commands. By virtue of this control of the switching units of the switching matrix, the cross-connection between input terminals receiving bipolar 3-level input signals and output terminals providing bipolar 3-level output signals is controlled. Further, by virtue of the coding arrangement used in the present invention, the EDSX is transparent to any bipolar violations which may exist in the bipolar 3-level input signals.

Figure 1:
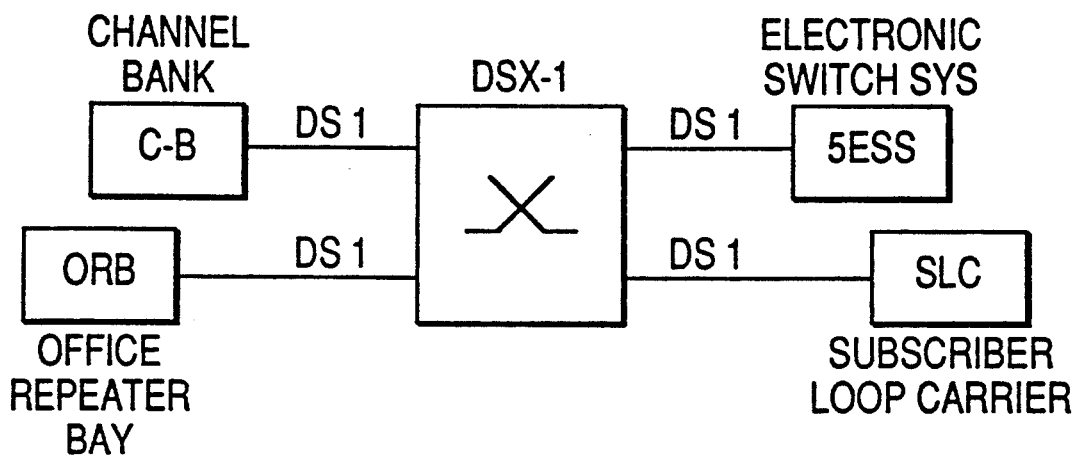
FIG. 1 is a block diagram showing the location of a prior art manual DSX in a communication system, noting that the EDSX of the present invention can serve as a direct replacement for the DSX shown in FIG. 1.
Figure 2:
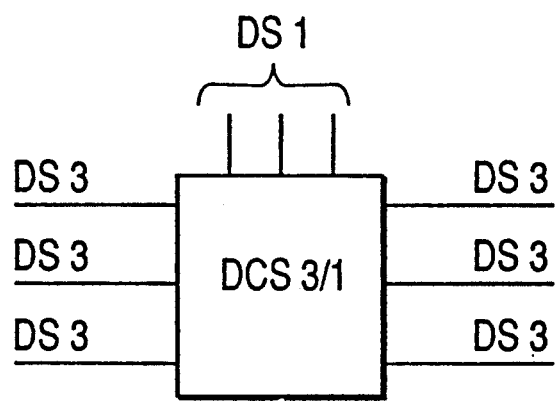
Figure 3:
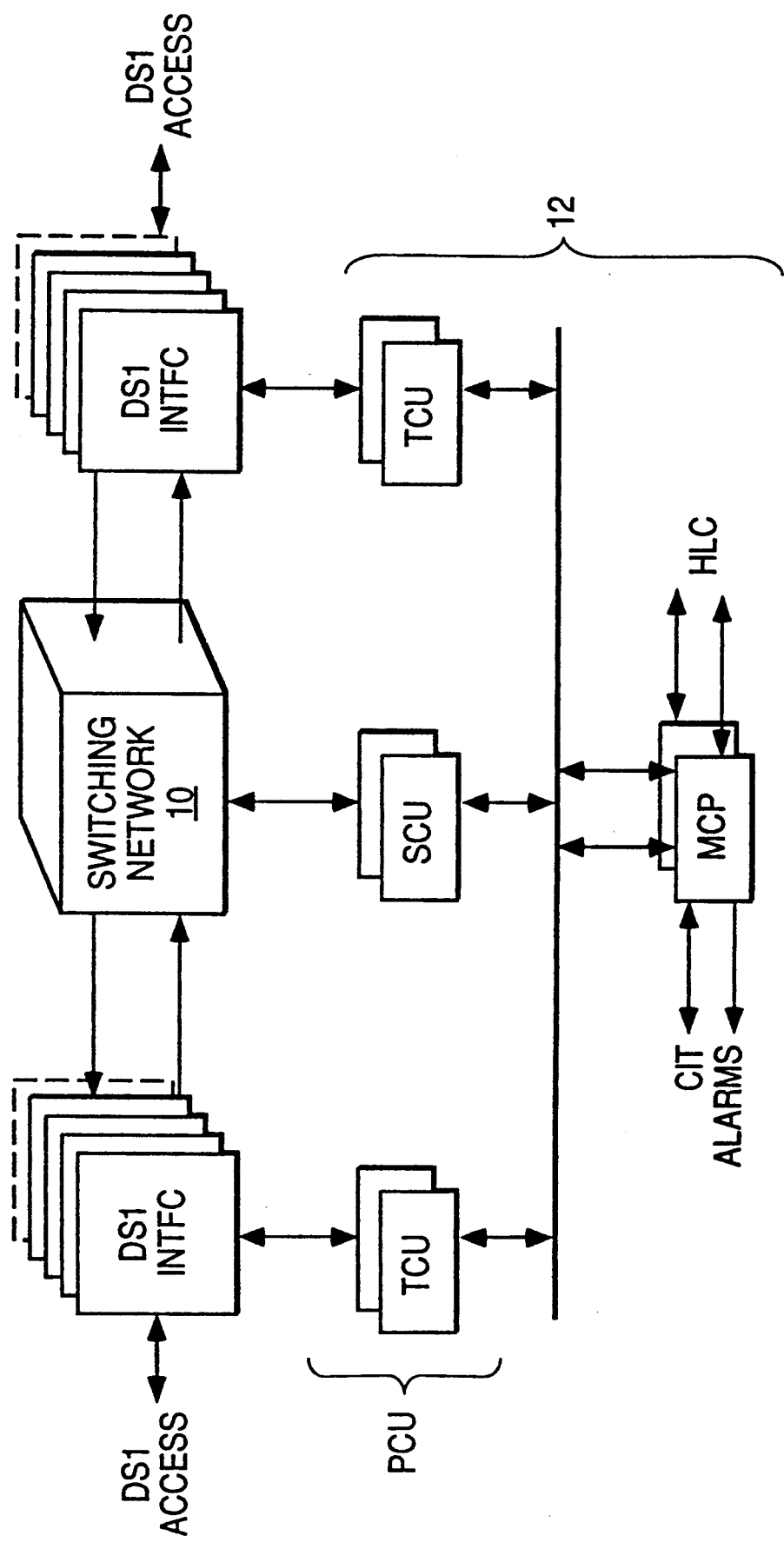
Figure 4:
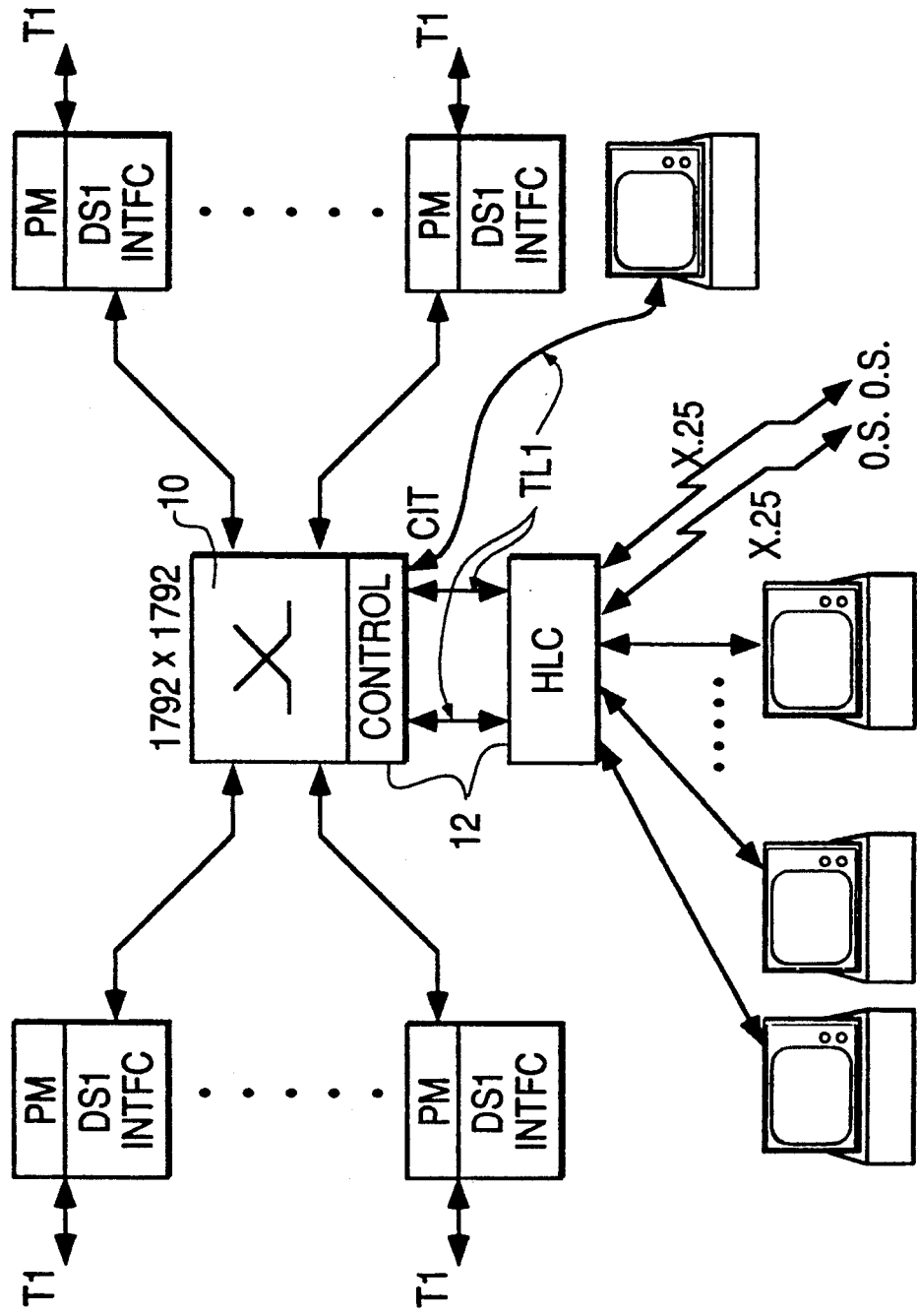
Figure 5:
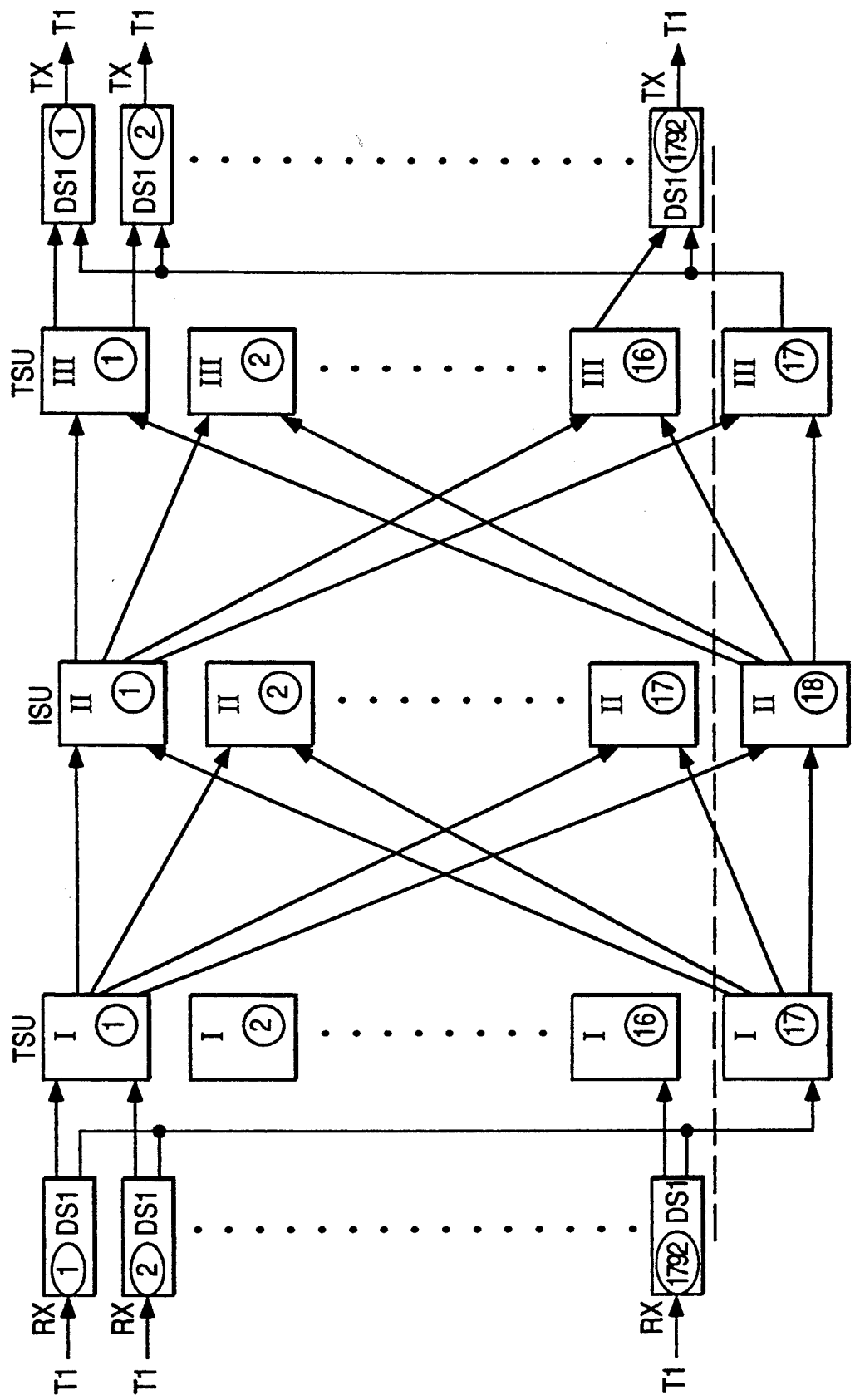
Figure 6B:
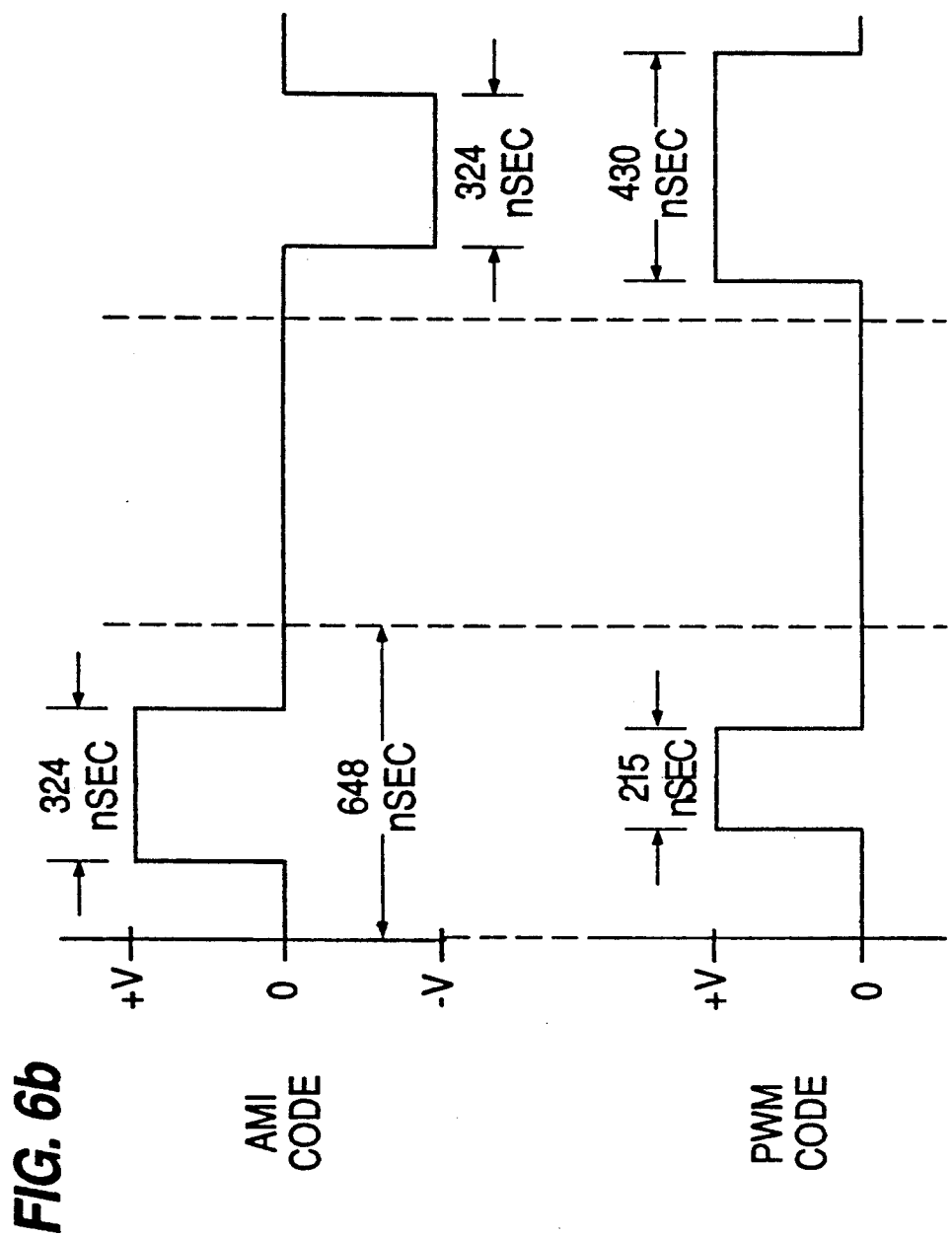
Figure 7:
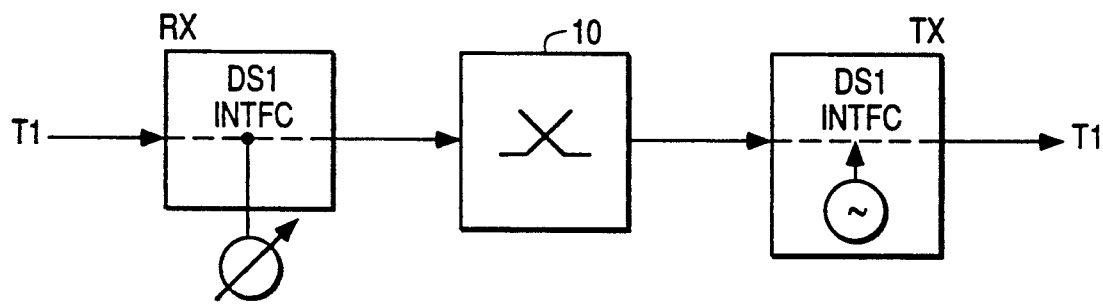
Figure 8:
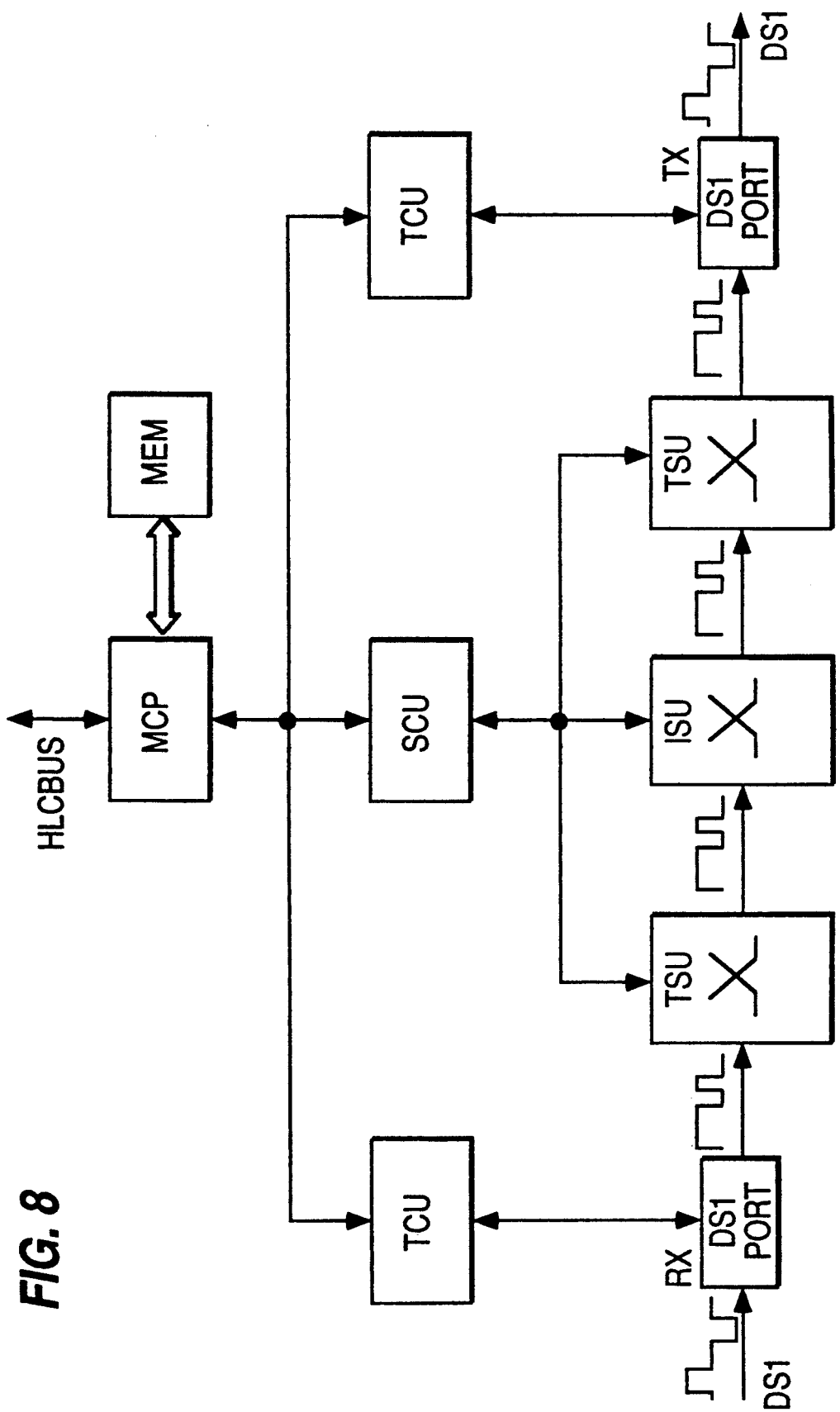
Figure 9:
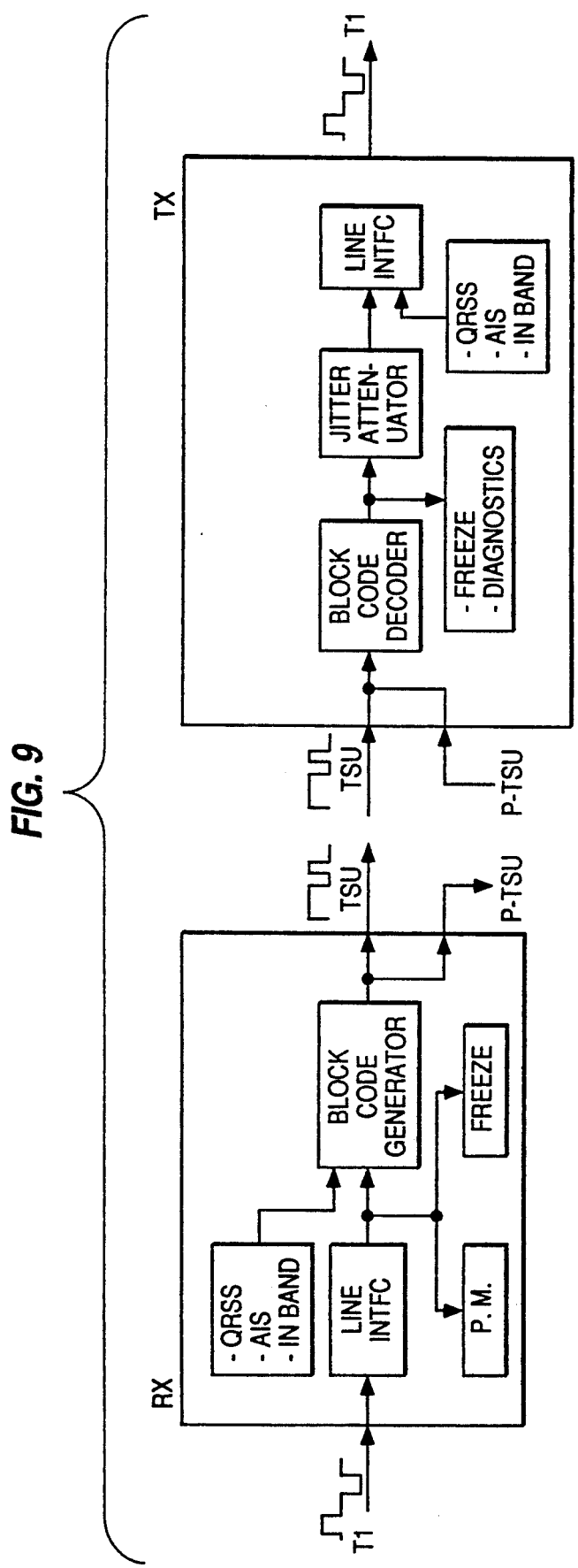
Figure 10:
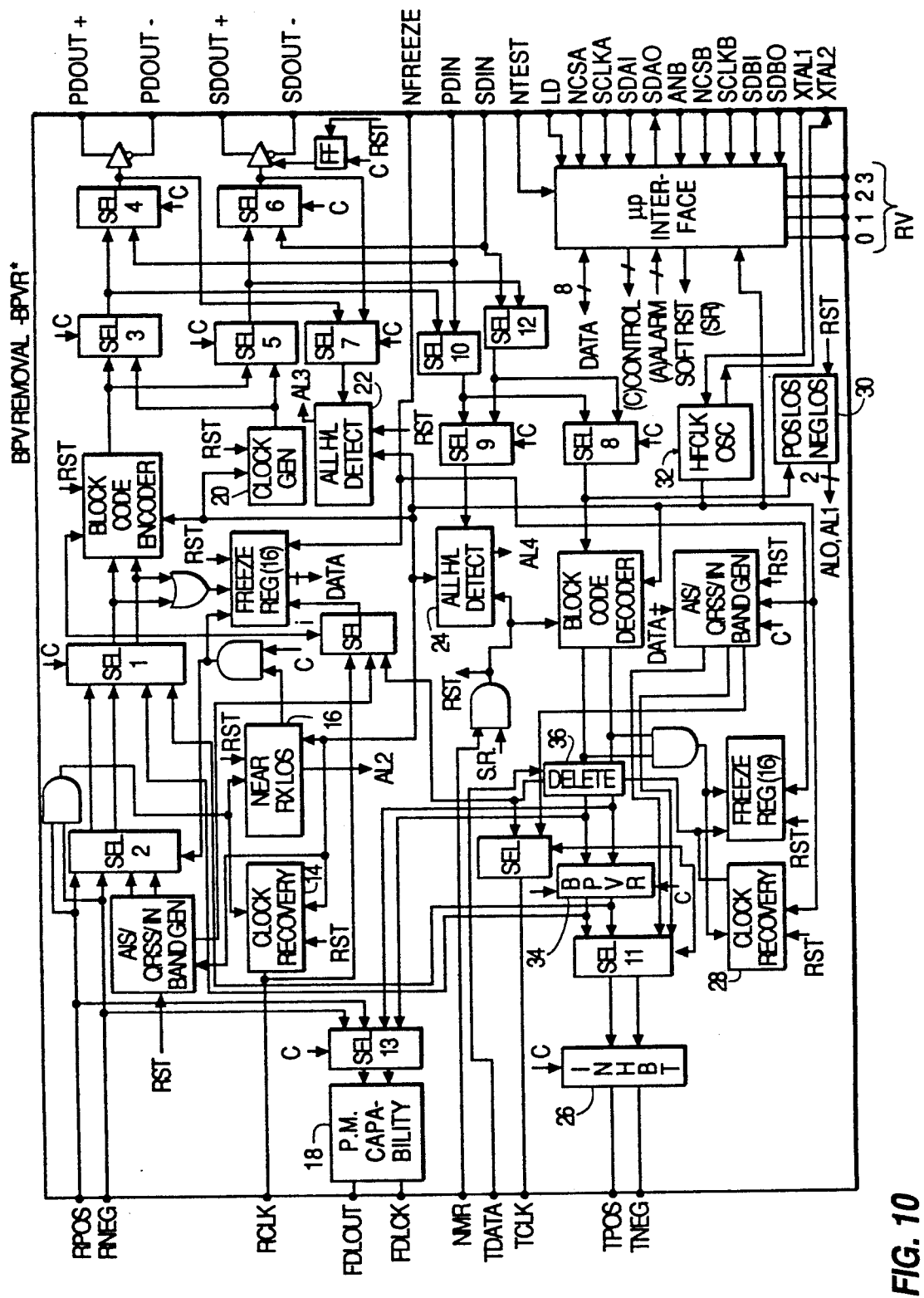
Figure 14:
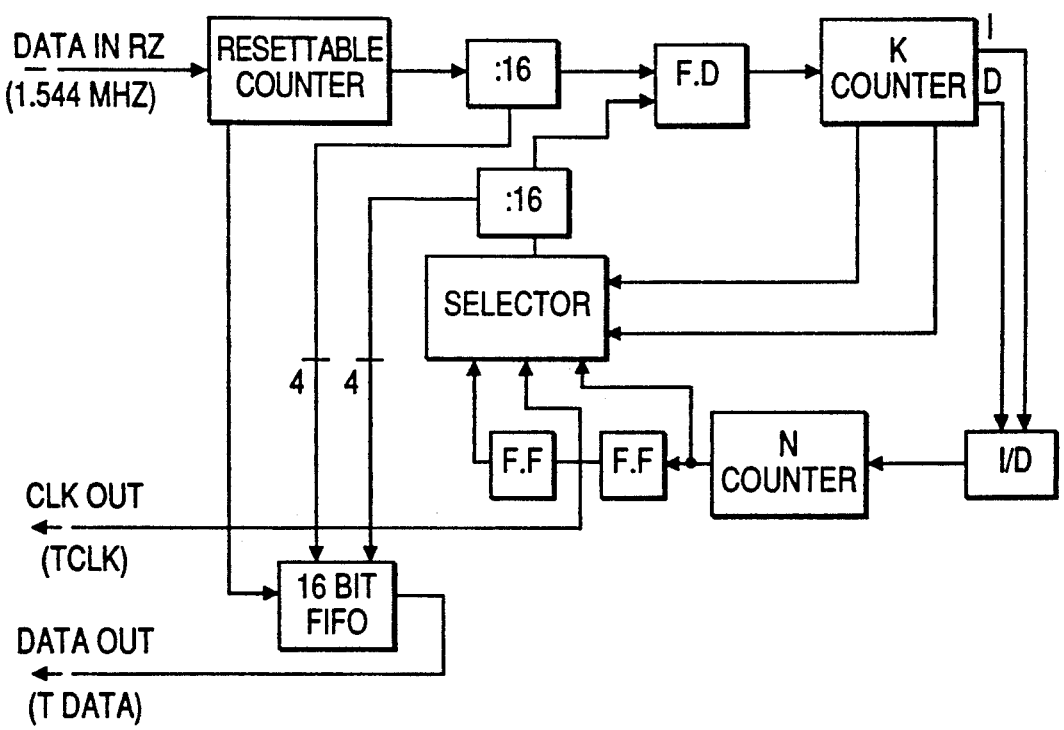
Figure 16:
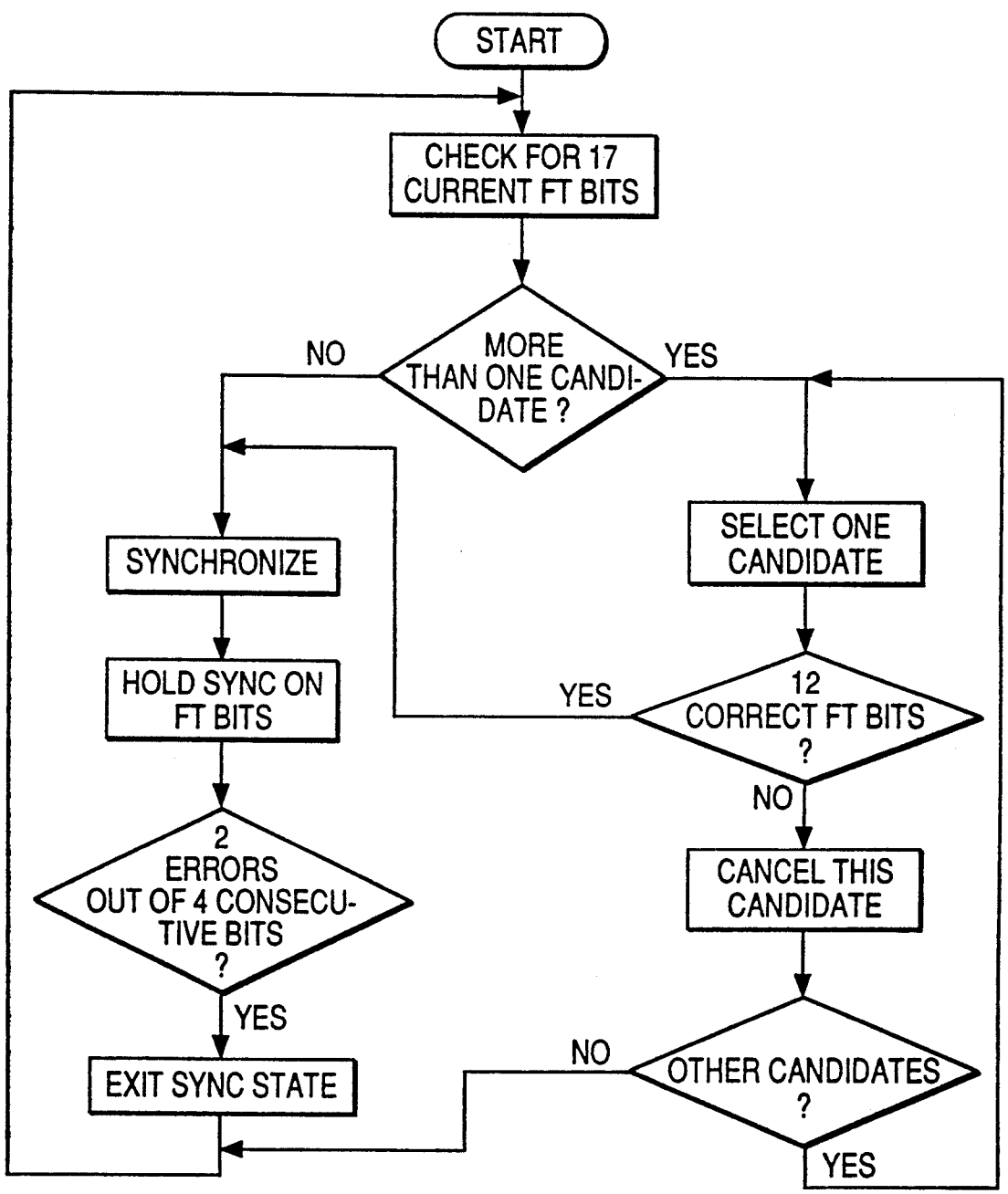
Figure 17:
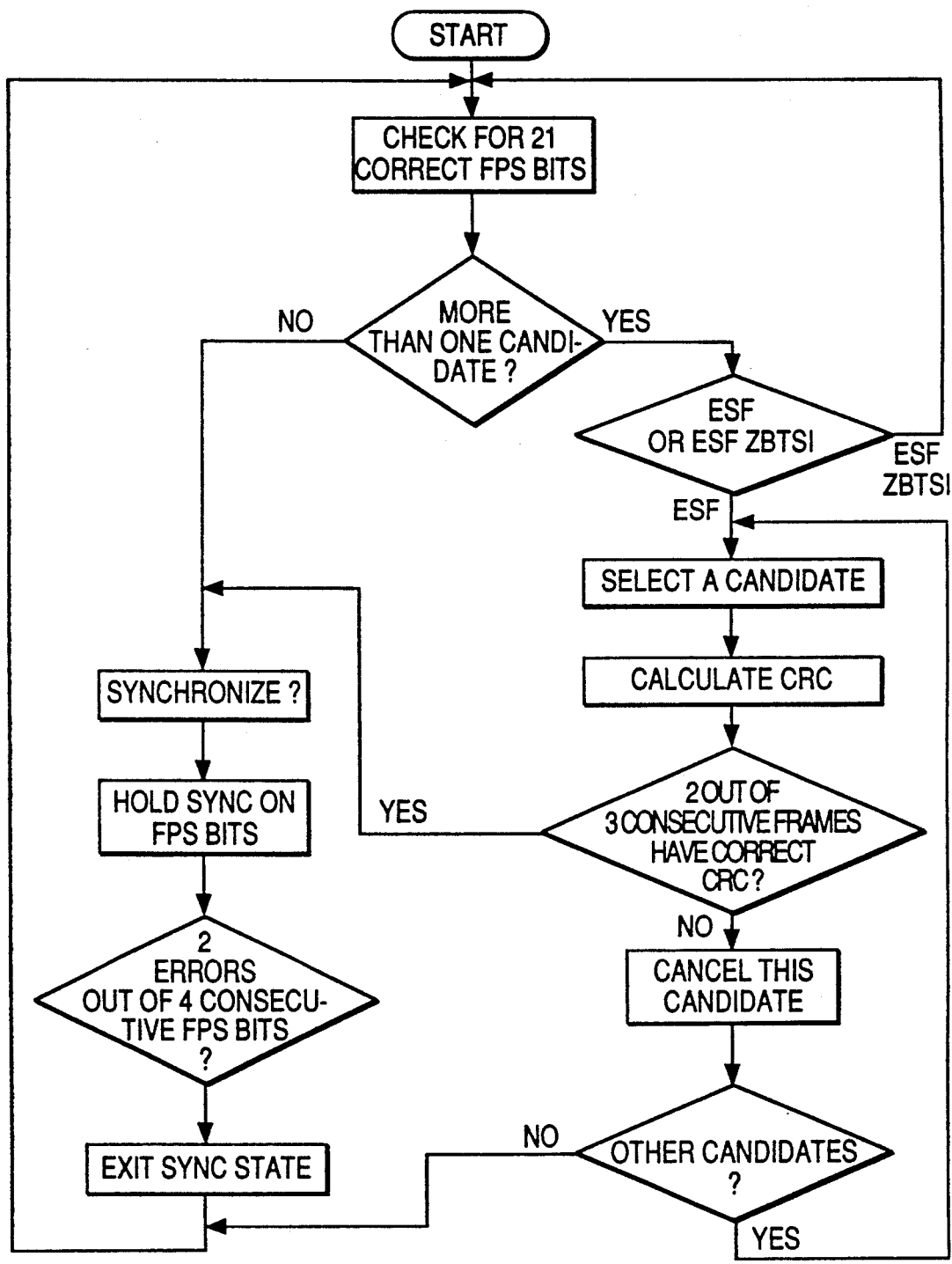
Figure 20:
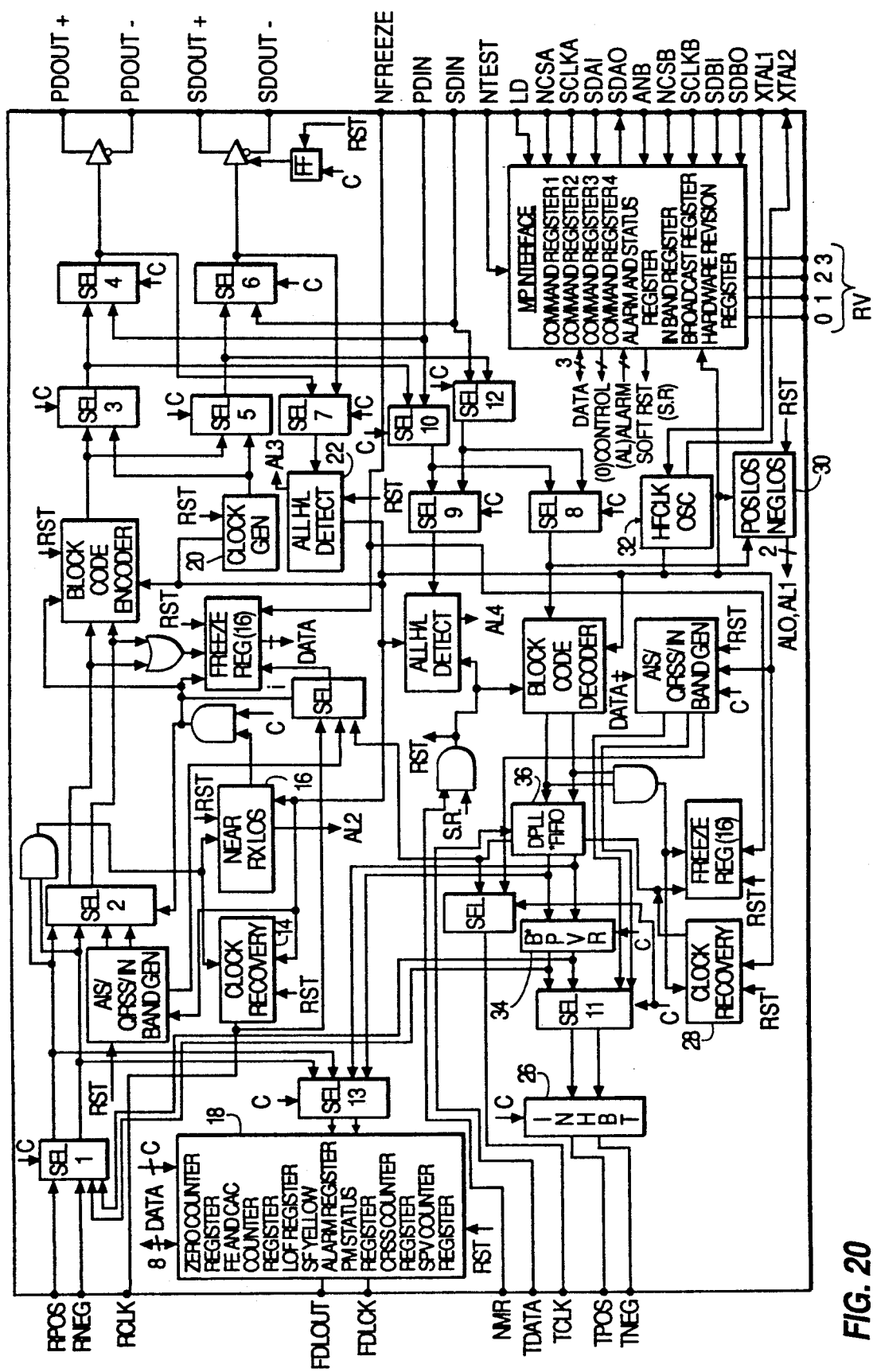
Figure 21:
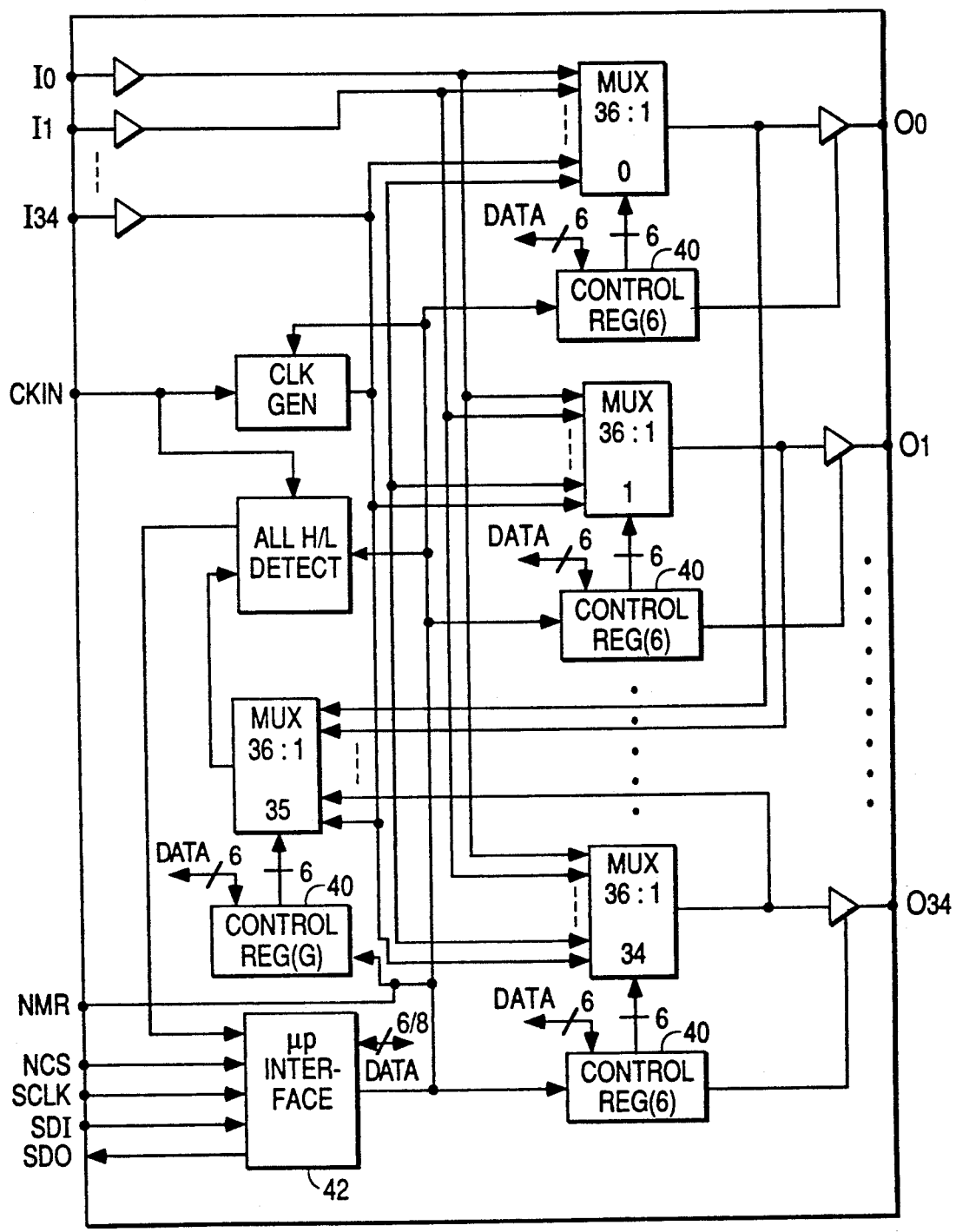
Figure 22:
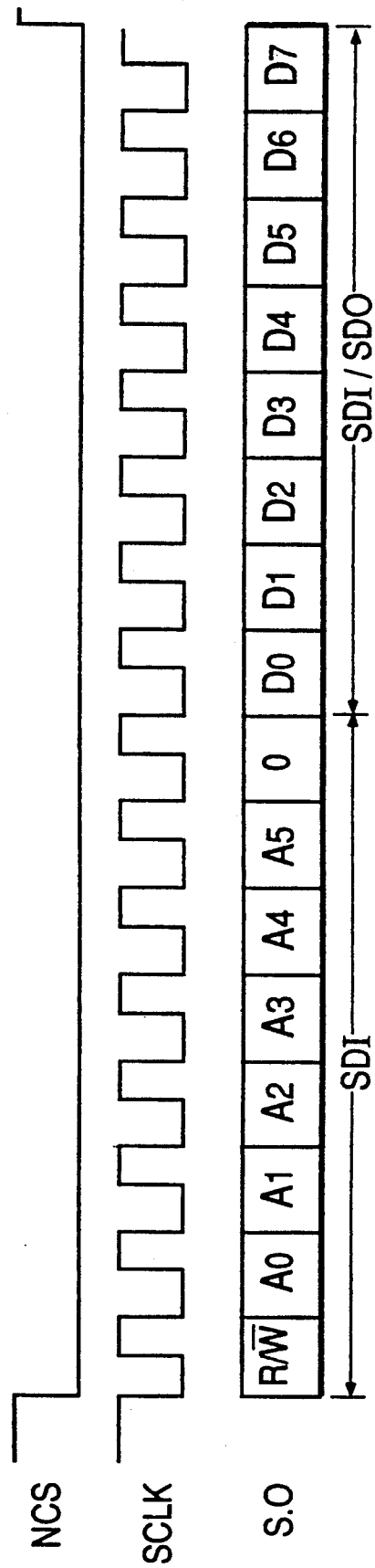
Figure 23:
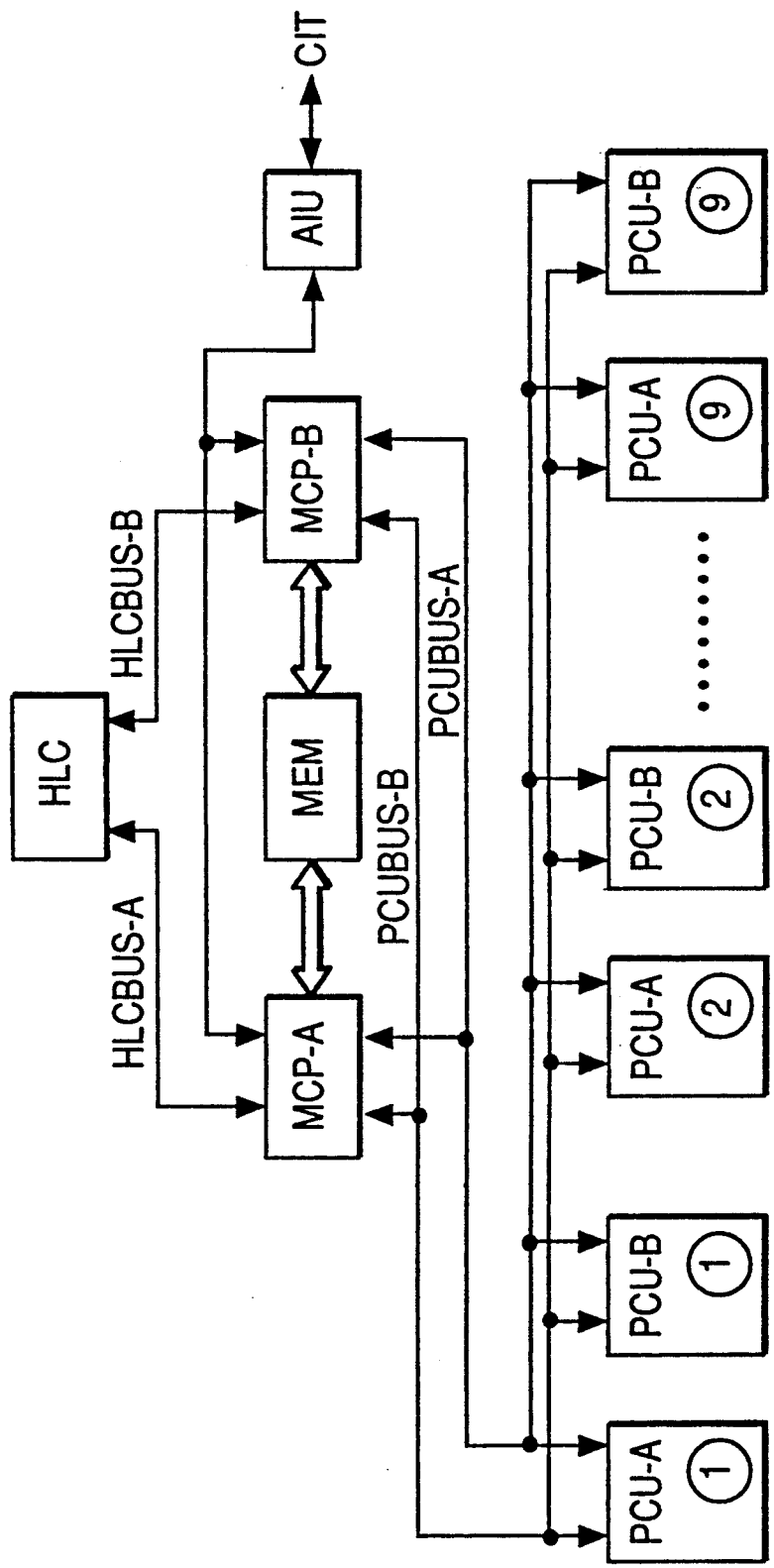
Figure 24:
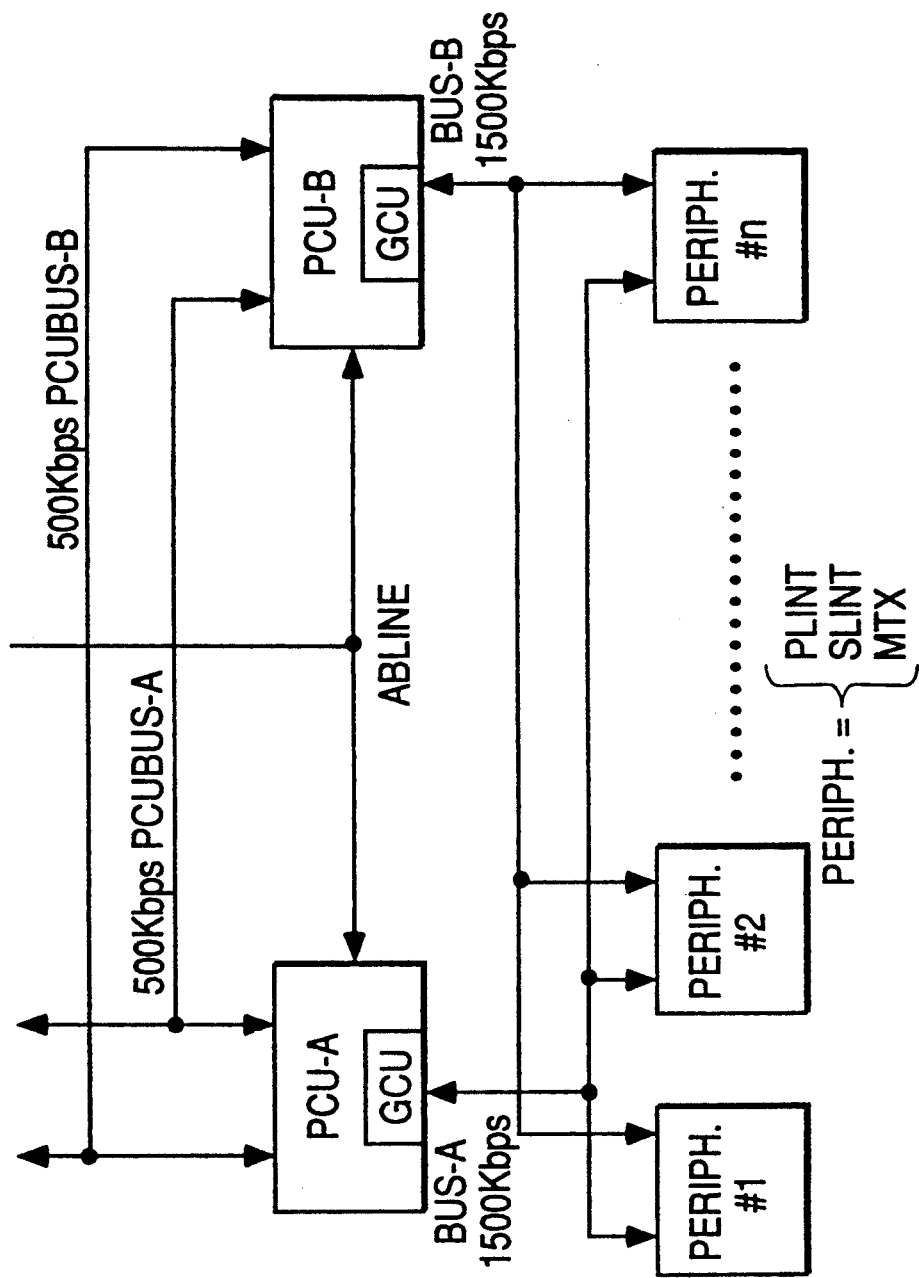
Figure 25:
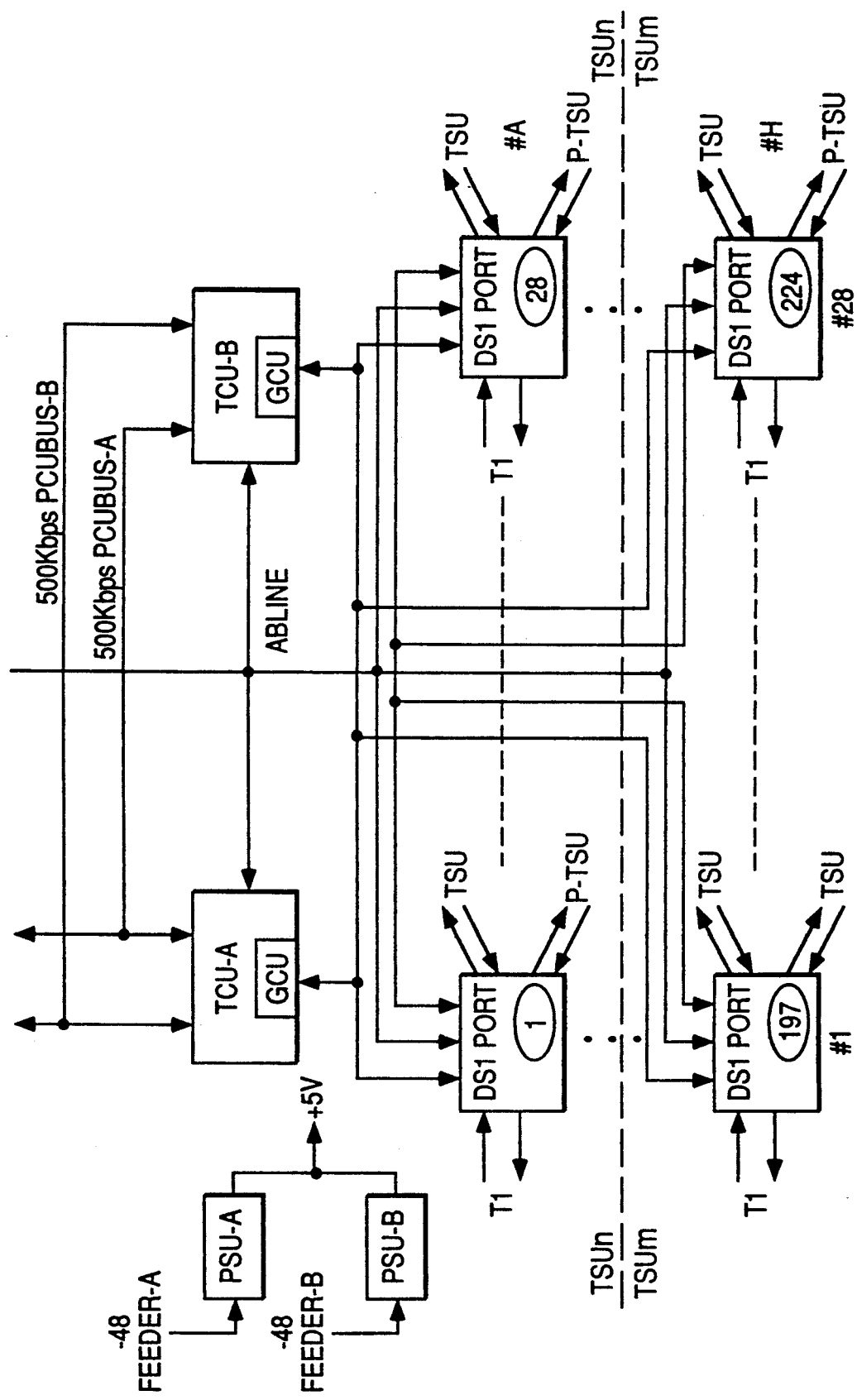
Figure 26:
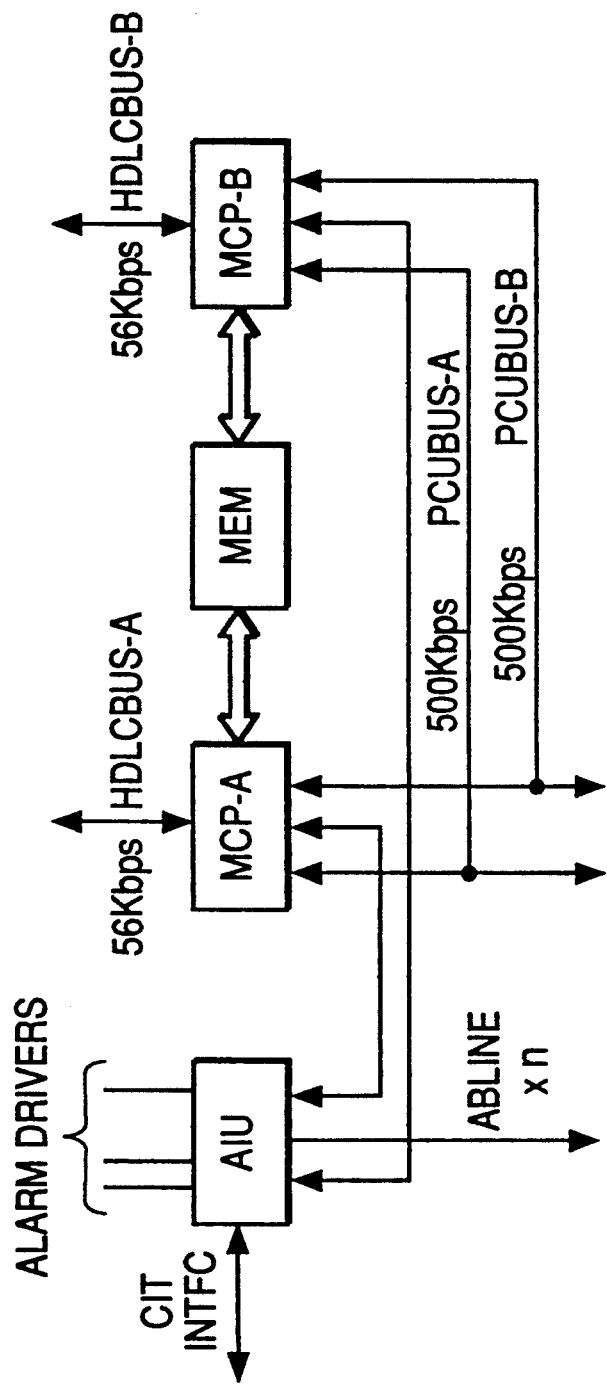
Figure 27:
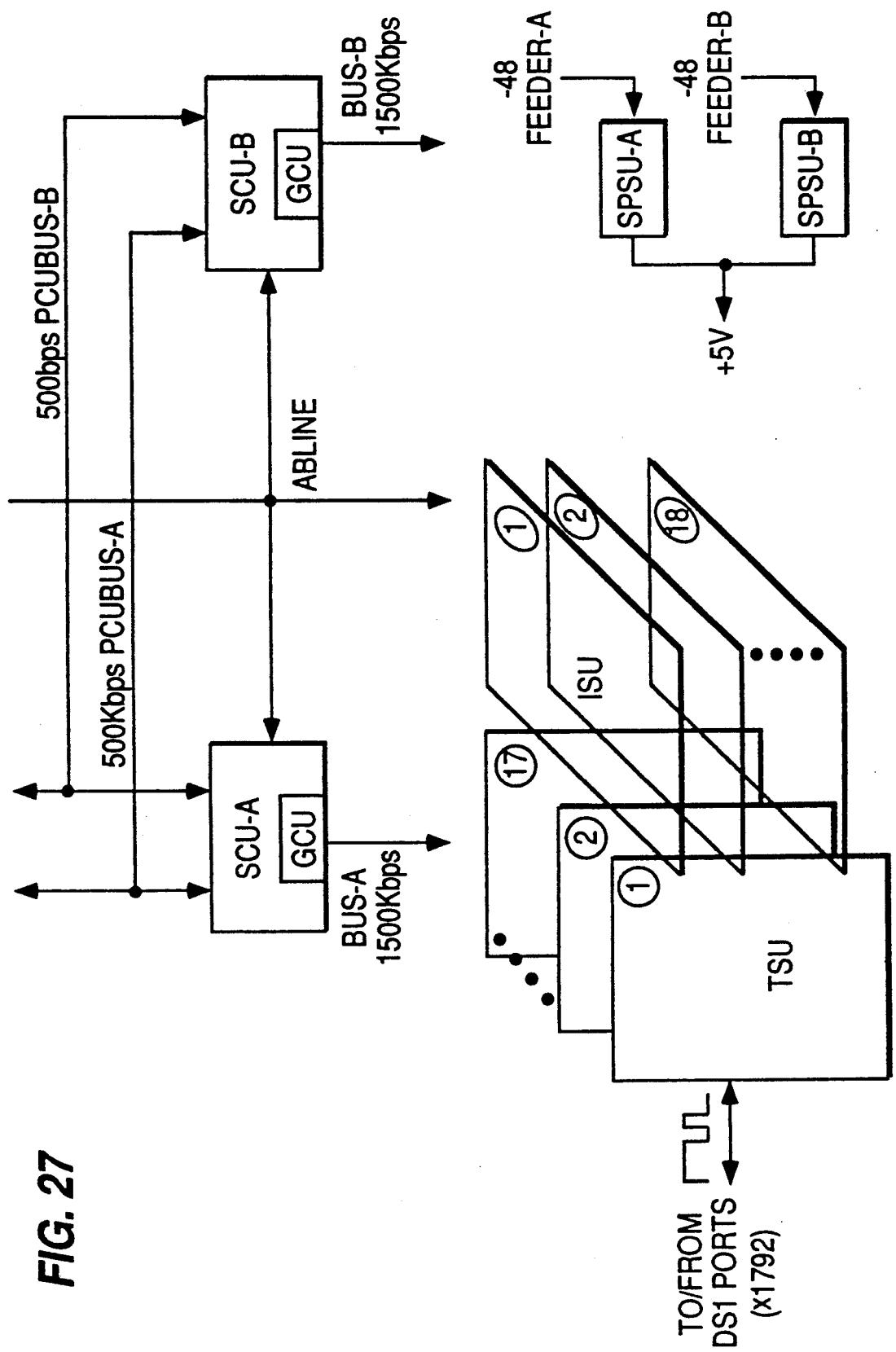
Figure 28:
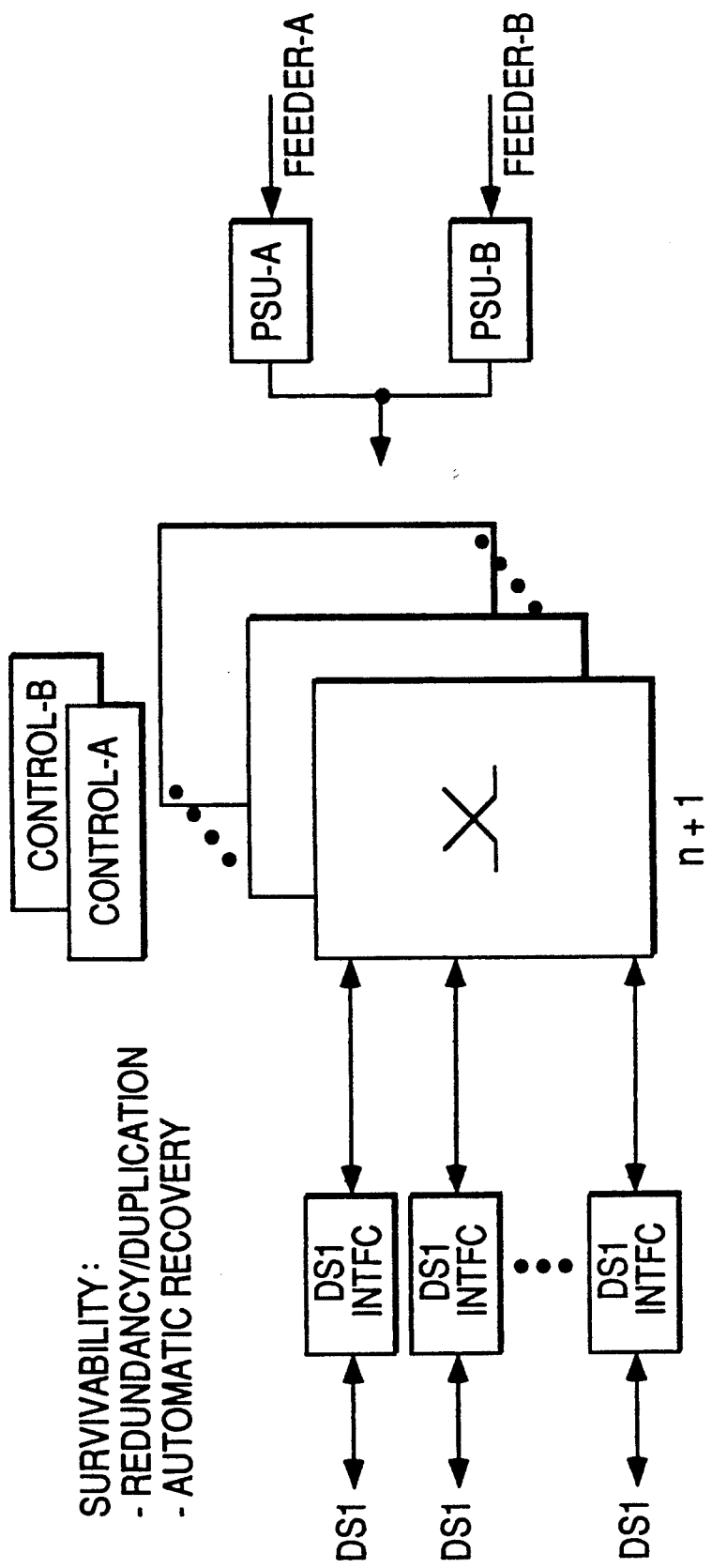
Figure 29:
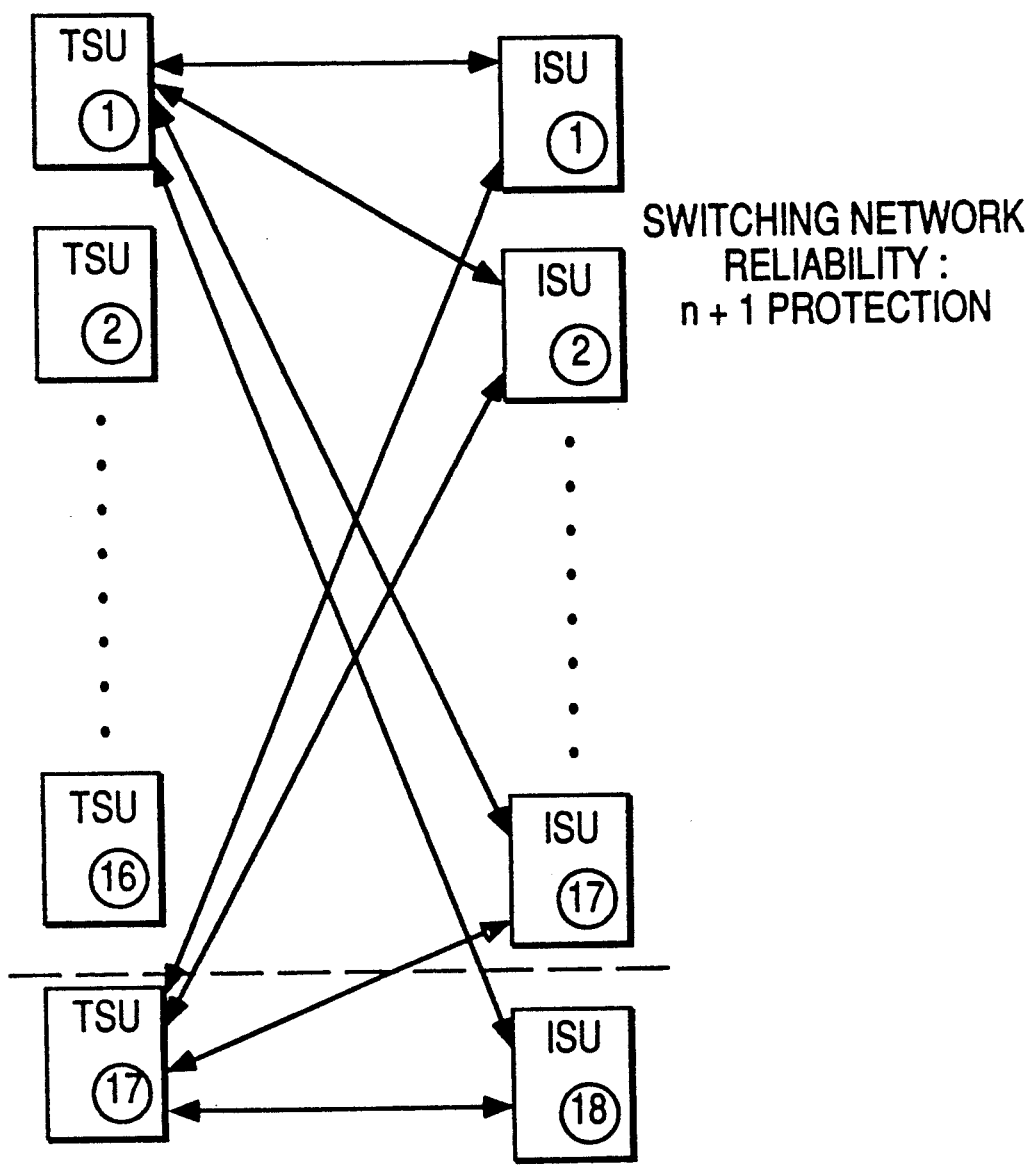
Figure 34:
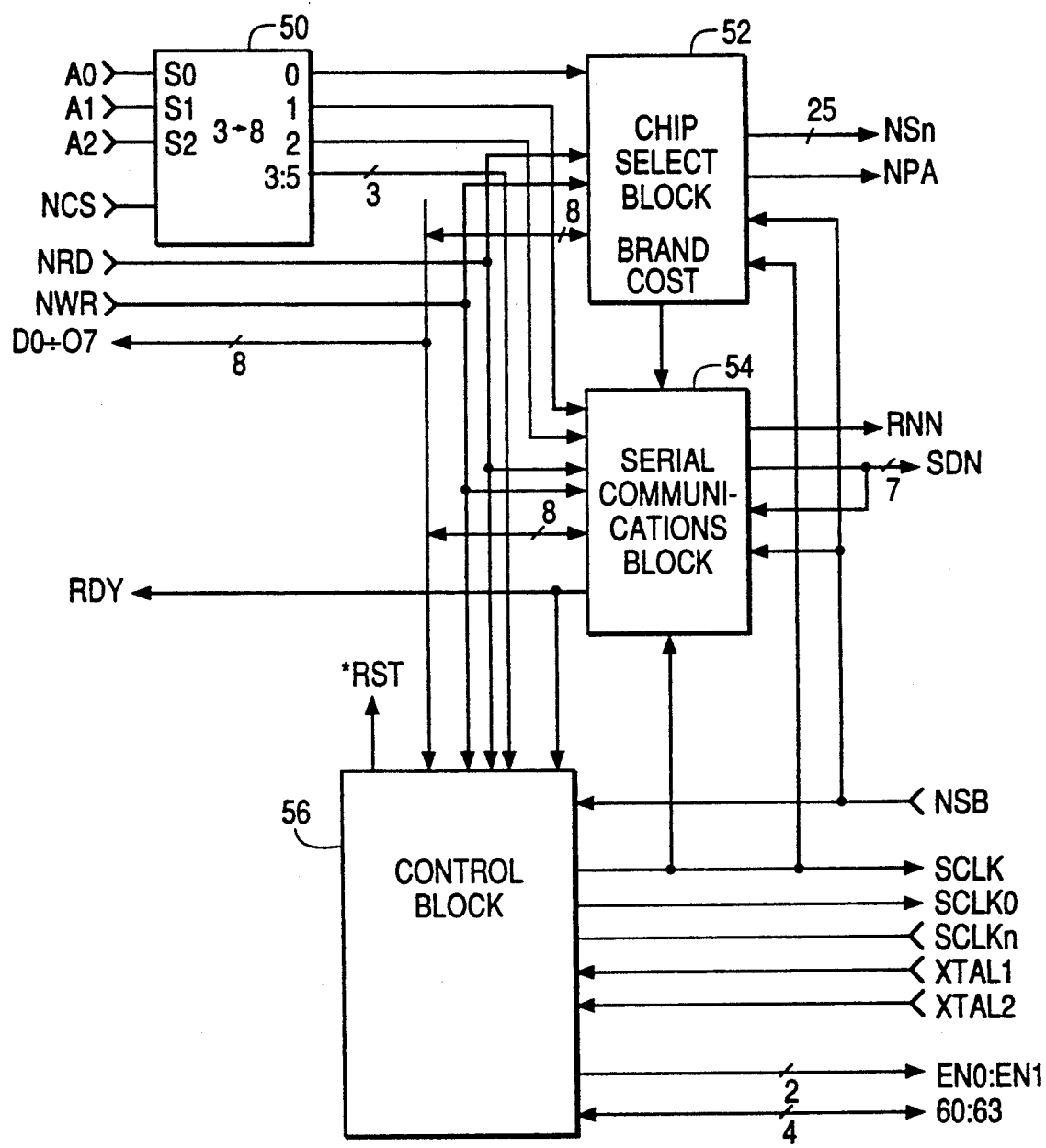
Figure 35:
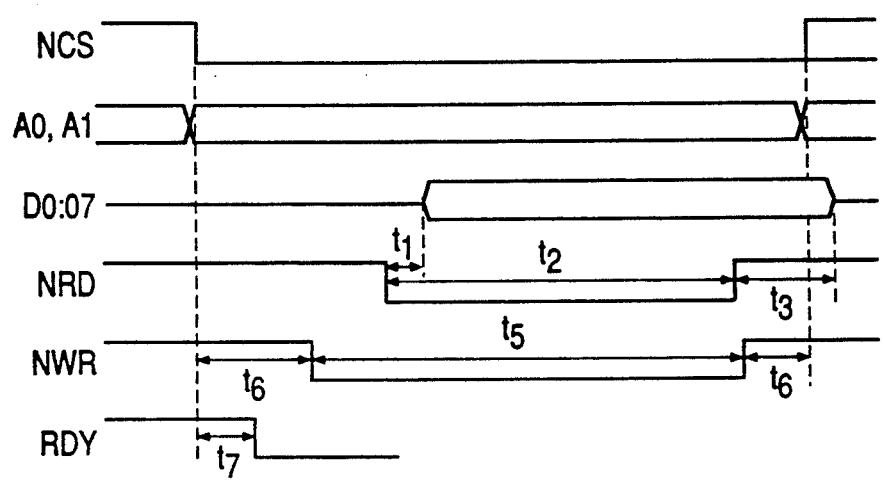
Figure 36:
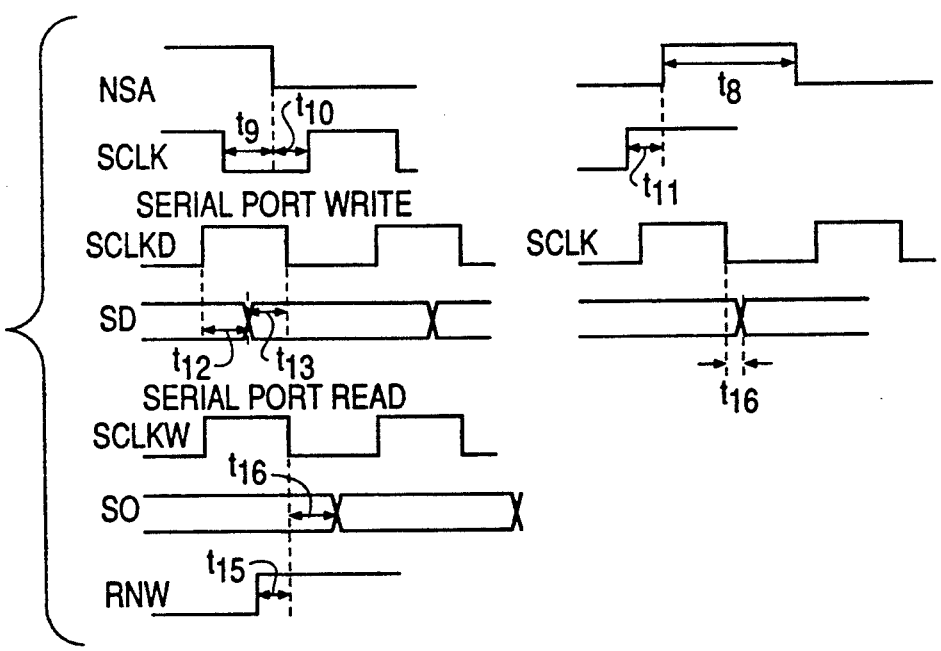
Figure 37:
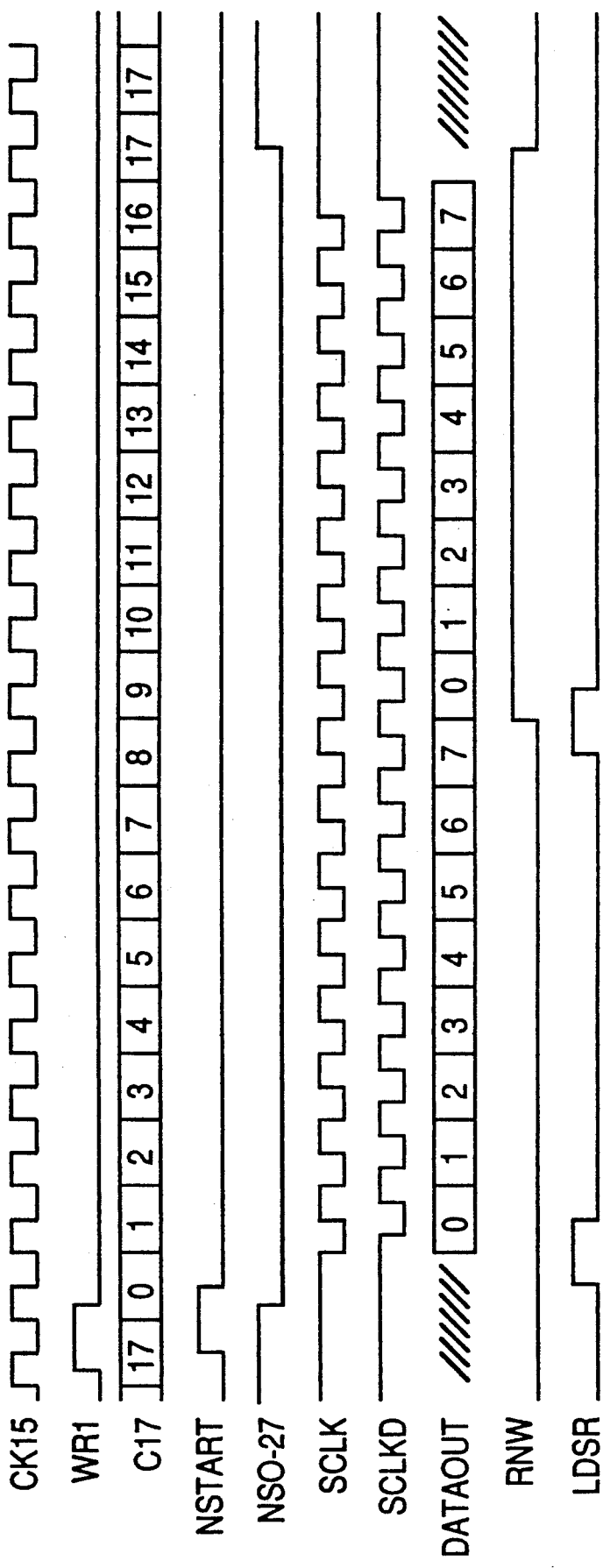

FIG, 2 shows a prior art DCS-3/1 system;

FIG. 3 shows a block diagram of an overall EDSX system in accordance with the present invention illustrating three main parts of the EDSX;

FIG. 4 is a block diagram of the EDSX system of the present invention showing performance monitoring and interface arrangements for the system;

FIG. 5 shows an embodiment for the cross-connect switching matrix of the present invention;

FIGS. 6A and 6B are diagrams showing the use of the interface circuits for converting the 3-level input signals to pulse width modulated coded signals to achieve bipolar transparency;

FIG. 7 is a diagram showing the use of the interface circuitry for performance monitoring and DS1 level maintenance;

FIG. 8 is a block diagram showing the DS1 signal flow through the EDSX system of the present invention with the conversion of the bipolar 3-level input signals into a block coded signal and the decoding of this block coded signal back to a bipolar 3-level signal;

FIG. 9 is a block diagram showing an embodiment of the DS1 interface circuit in accordance with the present invention;

FIG. 10 is a more detailed block diagram of an embodiment of the DS1 interface circuit in accordance with the present invention;

FIGS. 11-13, 15, 18 and 19 are waveform diagrams regarding operation of the DS1 interface circuit of the present invention;

FIG. 14 shows a digital phase lock loop circuit to eliminate jitter in the interface circuit of the present invention;

FIGS. 16 and 17 are flowcharts showing aspects of the interface circuit operation;

FIG. 20 is an expanded block diagram of FIG. 10 illustrating locations for various registers and counters in the performance monitoring line interface unit;

FIG. 21 is a block diagram of a matrix switching unit MTX used in the switching matrix of the present invention;

FIG. 22 is a waveform diagram illustrating various signals found in FIG. 21;

FIGS. 23-29 are block diagrams showing elements in the control circuitry, including arrangements for redundancy operation;

FIGS. 30-33 are block diagrams showing details of elements of the control structure shown in FIG. 23;

FIG. 34 is a block diagram showing the construction of a global control unit GCU in accordance with the present invention; and FIGS. 35-37 show timing diagrams for the operation of the structure of FIG. 24.

DETAILED DESCRIPTION OF THE PRESENT INVENTION

FIG. 3 shows an overall block diagram of a preferred embodiment of the present invention. Referring to FIG. 3, it can be seen that the EDSX of the present invention is comprised of the three basic functional units of a DS1 interface unit, a switching network unit 10 and a control unit 12 (shown as comprising a peripheral control unit PCU having terminal control units TCU and switch control units SCU, a main control processor MCP and a high level controller HLC). It is noted that the high level controller HLC can be an IBM compatible PC or some other appropriate program control unit. The main control processor MCP is also coupled to craft interface terminals CIT and alarms.

The DS1 interface unit includes receive line interfaces RX and transmit line interfaces TX (e.g. see FIG. 5) on input and output sides of the switching network unit 10. The structure of FIG. 3 can be constructed to have DS1 terminal interface units TIU receiving 32 DS1 duplex lines each, although this number is not intended to limit the present invention. It should be noted that, preferably, the DS1 interface unit is designed to meet the standard of ANSI T1.102-1987 for receiving and transmitting signals to equipment up to 655 feet from the line interface.

FIG. 4 shows an overall block diagram of the present invention which includes an illustration of the location of the performance monitoring circuitry PM in the DS1 interface units, and the connection of elements of the control unit 12 to individual craft interface terminals CIT and operation systems OS through the high level control unit HLC or through lower level control units such as the main control unit MCU. By virtue of this connection, the EDSX of the present invention can be externally controlled or monitored by the craft interface terminal CIT or an operating system OS. In addition, the performance monitors PM serve as built-in performance monitoring units to determine if a problem occurs in the system. The arrangement provides a distinct advantage for the present invention over manual DSX system since the external access permits physically changing cross-connection in the switching network unit 10 without the need for re-wiring which is required in manual DSX units. FIG. 7. 7 also shows the connection of performance monitoring circuitry PM and DS1 maintenance in conjunction with the RX and TX sides of the DS1 interface.

FIG. 5 shows the formation of the switching network unit 10 with a 3-stage arrangement of first terminating switch units TSU, intermediate switching units ISU and third stage terminating switch units TSU. By virtue of the interconnection of the terminating switch units and the intermediate switch units, a full availability, non-blocking, CLOS-type space switch network is formed to allow connection of any input DS1 line with any output DS1 line (noting that in FIGS. 4 and 5, each individual DS1 line is identified as T1). It is noted that although FIG. 5 shows a 1792×1792 switch network in accordance with the present invention, the present invention is not limited to this particular number of ports. As will be discussed in greater detail hereinafter, each of the terminating switch units TSU and intermediate switch units ISU are formed with basic multiplex switch elements MTX that have a plurality of inputs and outputs.

FIGS. 6A and 6B illustrate an important aspect of the present invention in achieving bipolar violation transparency in the EDSX of the present invention which is equivalent to the bipolar violation transparency which occurs in a manual DSX. As shown in FIG. 6A, the RX side of the DS1 interface operates to convert the bipolar 3-level signals into a pulse width modulated PWM coded signal to be routed to the switching matrix unit 10. On the other hand, the TX side of the DS1 interface operates to decode the PWM coded signal into a bipolar 3-level output signal which is equivalent to the input bipolar 3-level signal. Most importantly, the output bipolar 3-level signals will include any bipolar violation (deliberate or otherwise) because the PWM coding preserves all three levels of the input bipolar 3-level signal.

The actual coding is shown more specifically in FIG. 6B As can be seen there, a typical time slot for each of the three levels of the bipolar 3-level signal is 648 nsec. The actual pulse width for the positive and negative pulse is 324 nsec. Using PWM coding, the positive volt levels are converted to narrow positive pulses while the negative levels are converted to wide positive pulses. By way of example, the narrow pulses can be set at 215 nsec while the wide pulses can be set at twice that width (i.e. 430 nsec), although this is solely for purposes of example. As such, the PWM coded signals can all have the same positive polarity. The 0 voltage middle level for the bipolar 3-level signal is preserved by virtue of remaining at 0 level in the PWM coded signal. Accordingly, the PWM coded signal is an actual reflection of all three levels of the input signal. By virtue of this, the conversion back to a bipolar 3-level signal will accurately reflect the actual bipolar nature of the input signal, including any bipolar violations of the alternate mark inversion AMI code.

FIG. 8 shows an overall diagram of the signal flow through the interface and switching network 10 with the connection of the elements of the control unit 12. As seen in FIG. 8, the bipolar 3-level input signals enter the RX side of the DS1 interface where they are converted into PWM coded signals, as discussed above. These coded signals are passed through the three stages (TSU, ISU and TSU) of the switching network to the TX side of the DS1 interface. In the TX side of the DS1 interface, the coded signals are converted back to bipolar 3-level signals corresponding to the input bipolar 3-level signals, as discussed above. It should be noted that the input and output bipolar 3-level signals will have the same bit rate (typically 1.544 MBPS for DS1 signals).

Beyond the conversion operation between bipolar 3-level signals and PWM coded signals, FIG. 8 provides a general illustration of the connection of the control units to the DS1 interface elements and to the elements of the switching unit 12. More specifically, terminal control units TCU are coupled to the DS1 interface while a switching control unit SCU is coupled to the switching units. Both the terminal control units TCU and the switching control unit SCU are under the control of the main control processor MCP, which is, in turn, under the control of the high level controller HLC. The terminal control units TCU and the switch control unit SCU are part of the peripheral control units PCU shown in FIG. 3.

In operation, the control unit 12 serves to control the DS1 interface circuits and the switching elements to cross-connect a predetermined input for the switching network 10 with a predetermined output thereof. Referring to FIG. 5, for example, a predetermined one of the bipolar 3-level inputs applied to the T1 lines at the RX side of the DS1 interface will be connected, under the control of control units such as shown in FIG. 8 to a predetermined one of the output lines T1 coupled to the TX side of the DS1 interface. In this way, cross-connection is achieved.

With regard to the control units, it is noted that these are preferably software control elements. As discussed above, the overall control unit 12 can be implemented by three levels of peripheral control units PCU (which include the terminal control units TCU and switch control unit SCU of FIGS. 3 and 8), main control processor MCP, and the high level controller HLC. In an actual device, the peripheral control can be implemented by two PCU cards for each equipment shelf (including a DS1 interface and switching shelves). These PCU cards perform the following main functions:

Translate command from the main control to hardware setup;

Execute self diagnostics automatically or upon request;

Refresh functional hardware, respectively; and

Down-loading of specific software from main control.

The software down-loading of specific software from main control is necessary because the software for PCU operation is primarily stored in RAM. this allows for easy software modifications, maintenance or upgrading.

The main control function is performed by two main control processor (MCP) cards, located in a separate shelf together with other central function cards.

1 The MCP performs the following functions:

1 Translate TL1 protocol to commands to peripherals;
  Collect status and test results from peripherals;
  Compute and control switching network changes;
  Coordinate system diagnostics;
  Drive office alarms;
  Initiate recovery from power down or module failures; and
  Support duplicate CPUs.

As such, several important central functions for system operation reside on hardware also located in the MCP shelf. One of these functions is the clock generation.

The interfaces between the EDSX and external devices such as the high level controller, operation support system, and telemetry systems also reside on hardware located in the MCP shelf. The communication between the MCP and the PCUs is preferably performed via a duplicated serial bus at a rate adequate to the volume of information to be transferred. The information is transmitted in an encoded manner in order to allow error detection.

The high level controller HLC may be implemented on an external computer connected to the EDSX equipment via a standard data interface using TL1 protocol. The HLC can be equipped with menu-driven, user-friendly software which enables effortless supervision and control of the equipment. The high level controller HLC also supports the x.25 data link to Operations Systems. The system connection map can be updated locally from the controller or remotely from the Operation System via the x.25 data link to the EDSX.

FIG. 9 is a block diagram illustrating important elements of the DS1 interface, including both the RX and TX sides. The RX side includes a line interface circuit, a performance monitoring circuit, a block code generator (to form the PWM coded signal discussed earlier), a freeze circuit, and circuitry which provides signals that can be used instead of the DS1 signals for testing purposes. Examples of such testing signals shown in FIG. 9 include a quasi-random signal source QRSS, an alarm indication signal AIS, and an in-band signal source. On the TX, side, the DS1 interface circuit includes a block code decoder, a jitter attenuator, a line interface for the output, a freeze and diagnostics circuit, and a test circuit with the QRSS, AIS and in-band signalling capability also found on the RX side.

The freeze circuitry found on both the RX side and the TX side serves to sample the bipolar 3-level signals at both the RX and TX sides to determine if the information is the same in both units. This determination is carried out by way of the diagnostics circuit provided on the TX side. In this way, it can be determined that the signal passing through the cross-connection is correct at the output thereof. The jitter attenuator includes a phase lock loop circuit, as will be shown later, for eliminating jitter from the bipolar 3-level output signal provided at the output of the block code decoder (which converts the PWM coded signal from the RX side, after passing through the switching matrix, into the bipolar 3-level output circuit).

FIG. 9 also shows a secondary path which is used as a protection path for redundancy (identified by the signal P-TSU). In this way, if a breakdown occurs in the primary path, the secondary path can serve to protect the cross-connection of the input and output DS1 lines to one another.

FIG. 10 provides a more detailed block diagram of the DS1 interface of the present invention. Although the present invention is not limited to this, the structure can be laid out with a 44-pin arrangement with the pins being designated as follows:

1. PIN-OUT

| Pin | Designation | I/O | Function |
| --- | --- | --- | --- |
| 41,40 | TPSO,TNEG | O | DS1 line outputs to the physical interface |
| 39,37 | RPOS,RNEG | I | DS1 line inputs from the physical interface |
| 25,24 | PDOUT+, PDOUT− | O | Main output to the equipment side |
| 22,21 | SDOUT+, SDOUT− | O | Secondary output to the equipment side |
| 7 | PDIN | I | Main input from the equipment side |
| 9 | SDIN | I | Secondary input from the equipment side |
| 43 | XTAL1 | I | Crystal or external clock input |
| 42 | XTAL2 | O | Crystal input |
| 3 | TCLK | O | Transmit clock output |
| 4 | RCLK | O | Receive clock output |
| 35 | NFREEZE | I | FREEZE control input for the FREEZE registers |
| 5 | NMR | I | Reset line input |
| 2 | LD | O | LED control |
| 33 | NCSA | I | Input of component selection signal for serial communication channel A |
| 31 | SCLKA | I | Input of component selection signal for clock signal of serial communication channel A |
| 26 | SDAO | O | Output of serial data line of serial communication channel A |
| 29 | SDAI | I | Input of serial data line of serial communication channel A |
| 13 | NCSB | I | Input of component selection signal for serial communication channel B |
| 15 | SCLKB | I | Input of component selection signal for clock signal of serial communication channel B |
| 20 | SDBO | O | Output of serial data line of serial communication channel B |
| 17 | SDBI | I | Input of serial data line of serial communication channel B |
| 11 | ANB | I | Selection input for the active serial communication channel B |
| 6,8,10,36 | RV0–RV3 | I | Input of card hardware version |
| 12 | NTEST | I | Input of TEST control line |
| 30 | FDLOUT | O | FDL data output |
| 32 | FDLCLK | O | FDL clock output |
| 16,23,34,38 | OUT1–OUT4 | O | Test outputs |
| 14 | TDATA | O | NRZ data output on the TX side |
| 18,28,44 | VCC | I | Supply voltage input |
| 1,19,27 | VSS | I | Ground input |

2. GENERAL STRUCTURE OF DS1 INTERFACE

In FIG. 10, the upper portion of the circuit is the RX side of the DS1 interface while the lower portion is the TX side. All of the selectors (e.g. SEL1, SEL2, etc.) shown in the figure are used for diagnostic control via the peripheral control units PCU.

On the RX side of FIG. 10, the bipolar 3-level signals are applied to the RPOS and RNEG terminals shown in the upper left-hand corner of the figure. On the other hand, the main outputs from the RX side to the switching network 10 (i.e. the PWM coded signals) are provided from the PDOUT+, PDOUT− terminals at the upper right-hand side of the figure. The BLOCK CODE ENCODER circuit operates to perform the conversion from the bipolar 3-level signals to the PWM codes signals, as discussed previously.

Also on the RX side, a clock recovery circuit 14 operates to permit clock recovery for performance monitoring. A near RX loss circuit 16 is provided to monitor any loss of signal on the received side of the DS1interface. A PM capability circuit 18 is also provided for the RX side to permit interface with the terminals FDOUT and FDCLK for performance monitoring. Also, in conjunction with the provision for monitoring signal loss on the RX side, a clock generator 20 is provided to generate a "keep alive" signal if, in fact, the received signal is lost. In addition to this, an all H/L detect circuit 22 is provided to verify that there is an output from the RX side for purposes of performance monitoring.

As noted above, the RX side operates to generate a main coded signal to apply to the switching matrix 10 from the terminals PDOUT+, PDOUT−. However, for purposes of redundancy, as shown in FIG. 10, the interface circuit can also generate a secondary coded output at the terminals SDOUT+, SDOUT− to apply to the switching network 10. This operates to set up a protection path through the switching network. Accordingly, it can be seen that the DS1 interface unit can be utilized to achieve redundancy, as well as to perform performance monitoring, monitoring the loss of a received signal, and generation of a keep alive signal, when necessary.

On the TX side of the DS1 interface unit (e.g. the lower part of FIG. 10), the main coded signal from the switching matrix 10 is received at the terminal PDIN. The secondary signal from the protection path is applied to the terminal SDIN. The received signals are applied to an H/L detect circuit 24 which will detect that there is an output from the switching matrix 10. The BLOCK CODE DECODER operates to convert the PWM coded signals from the switching matrix 10 into bipolar 3-level output signals, as discussed previously. These bipolar 3-level output signals are then applied to the terminals TPOS and TNEG to serve as the output of the cross-connect system.

If, for some reason, it is desired to prevent the output of the bipolar 3-level signal from the TX side, an inhibit circuit 26 is provided. Also, to eliminate jitter in the bipolar 3-level output circuit, a phase lock loop circuit can be provided in the clock recovery circuit 28 (corresponding to the jitter attenuator discussed above for FIG. 9). The RX side also includes a POS LOS/NEG LOS circuit 30 to ensure that positive and negative pulse information is received.

It can be seen that FIG. 10 also includes the freeze registers and the generation circuits for QRSS, AIS and in-band signals discussed with regard to FIG. 9. Also, a high-frequency clock oscillator 32 provides clock signals to all circuits on both the RX and TX sides (e.g. at 24×1.54 MPBS). In addition, a microprocessor interface circuit is provided to serve as a common interface for the RX and TX sides to interface with the microprocessor in the control unit 12. The TX side also includes a bipolar violation removal block BPVR 34 and a digital phase lock loop+first-in first-out buffer block DPLL+FIFO 36.

Having provided the above overview of the DS1 interface circuitry, the following detailed functional description is provided, in conjunction with FIGS. 11-20. In this description, the DS1 interface will, at times, be referred to as the P LINT, which stands for performance-monitoring line interface, and this can be constructed as as LSI (large scale integrated circuit). The following description pertains to details of registers and elements that can be used in forming a DS1 interface such as shown in FIG. 10, although the invention is not limited to the details of this description. FIG. 20 shows an expanded view of FIG. 10 to illustrate the location of various elements set forth in the following discussion.

3. FUNCTIONAL DESCRIPTION

3.1 Microprocessor Interface

3.1.1 Communication

The component communicates with the microprocessor via one of the two serial communication channels. The ANB signal selects the active serial communication channel: when the ANB is signal at logic '1' the communication is via channel A. When the ANB signal is at logic '1', the communication is via channel B.

The serial communication channel comprises four lines:
SCLK—1.5 MHZ serial communication clock
NCS—Select signal for the addressed component. This signal also serves as one of the parameters that determine the direction of the bi-directional data bus.
'2'—the serial bus is the input mode.
'0'—the component is selected and the serial bus is in the input or output mode.
SDI—Serial data input
SDO—Serial data output (open drain output)
The SDI and SDO lines are externally connected and constitute a bi-directional serial bus used for serial communication.

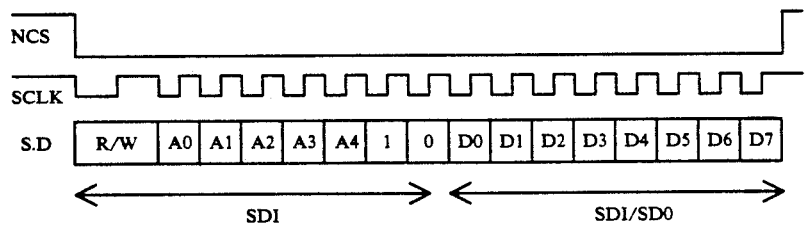

The information contains 2 bytes of eight bits each. The first byte always carries write data to the component. The second byte can be used to carry read or write data, in accordance with the state of the R/W* bit. R/W* determines the direction of the serial bus (SD) during the second byte interval.

R/W* = "1" Read output; the serial bus is used as an output from the component

R/W* = "0" Write output; the serial bus is used as an input to the component

A0 thru A4 The address of the internal register to be addressed during the second byte.

Bit 6 Must be "1", otherwise the PLINT is not addressed and will disregard the information. If the R/W* = 1, the output will remain in the TRI-STATE condition.

Bit 7 Always "0", otherwise the PLINT will not be addressed

D0 thru D7 Data to be written into/read from the component

The LSB of the data and the address is transmitted/received first, that is, the bit A0 or D0 is transmitted and received first.

When the bus operates in the input mode, it will sample the SDI input on the rising edge of the SCLK signal.

When the bus operates in the output mode, it will output the information on the SD0 line on the falling edge of the SCLK signal.

The unselected communication channel of the component can be tested, i.e. channel B can be tested when channel A is selected and vice-versa. The test is implemented by addressing the unselected channel and transmitting the first byte (byte contents are not significant in this operating mode). In response, the component will return on the same channel, during the second byte interval, the byte received during the first byte interval.

This method allows testing the redundant channel, without transferring to this channel the control on the component.

3.1.2 Register Description and Mapping

3.1.2.1 Command Register 1

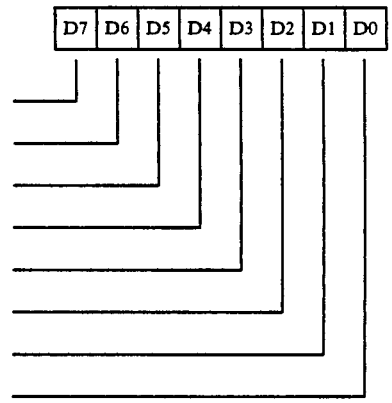

This is a write-only register used to determine the operating mode, but its contents can be read for checking its proper programming.

Register Address  A4 A3 A2 A1 A0
                   1  0  0  0  1

3.1.2.2 Command Register 2

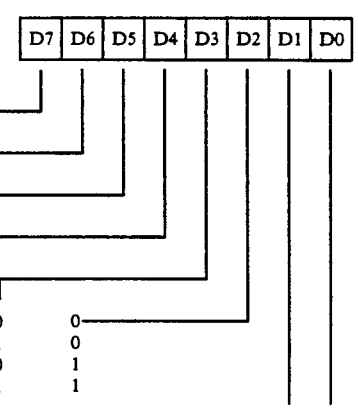

| | | |
|---|---|---|
| RX TRANSPARENT (SEL2) | 0 | 0 |
| RX AIS | 1 | 0 |
| RX QRSS | 0 | 1 |
| RX IN BAND | 1 | 1 |

This is a write-only register used to determine the operating mode, but its contents can be read for checking its proper programming.

Register Address

| A4 | A3 | A2 | A1 | A0 |
|---|---|---|---|---|
| 1 | 0 | 0 | 1 | 0 |

3.1.2.3 Alarm and Status Register

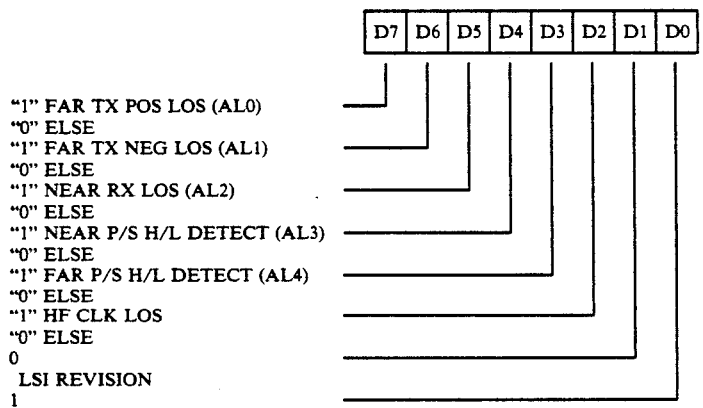

| D7 | D6 | D5 | D4 | D3 | D2 | D1 | D0 |
|---|---|---|---|---|---|---|---|

"1" FAR TX POS LOS (AL0)
"0" ELSE
"1" FAR TX NEG LOS (AL1)
"0" ELSE
"1" NEAR RX LOS (AL2)
"0" ELSE
"1" NEAR P/S H/L DETECT (AL3)
"0" ELSE
"1" FAR P/S H/L DETECT (AL4)
"0" ELSE
"1" HF CLK LOS
"0" ELSE
0
LSI REVISION
1

This is a read-only register.

Register Address

| A4 | A3 | A2 | A1 | A0 |
|---|---|---|---|---|
| 1 | 0 | 1 | 0 | 0 |

3.1.2.4 Command Register 3

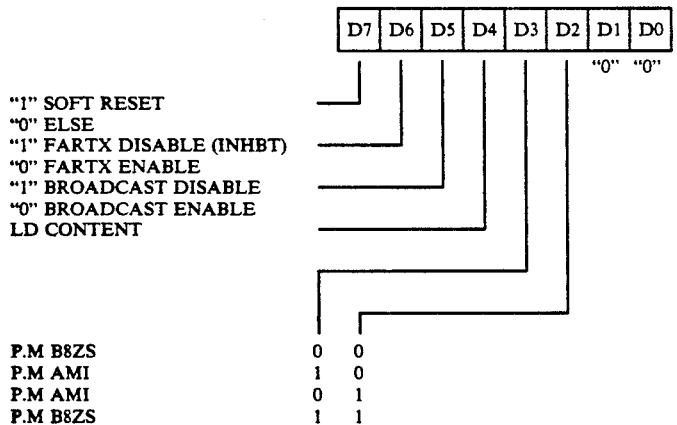

| D7 | D6 | D5 | D4 | D3 | D2 | D1 | D0 |
|---|---|---|---|---|---|---|---|
| | | | | | | "0" | "0" |

"1" SOFT RESET
"0" ELSE
"1" FARTX DISABLE (INHBT)
"0" FARTX ENABLE
"1" BROADCAST DISABLE
"0" BROADCAST ENABLE
LD CONTENT

| | | |
|---|---|---|
| P.M B8ZS | 0 | 0 |
| P.M AMI | 1 | 0 |
| P.M AMI | 0 | 1 |
| P.M B8ZS | 1 | 1 |

This is a write-only register, but its contents can be read for checking its proper programming.

Register Address

| A4 | A3 | A2 | A1 | A0 |
|---|---|---|---|---|
| 1 | 0 | 0 | 1 | 1 |

Bits D0 and D1 must be "0"; other combinations indicate a test state.

3.1.2.5 In-band Register

| D7 | D6 | D5 | D4 | D3 | D2 | D1 | D0 |
|---|---|---|---|---|---|---|---|

D0 thru D7  IN-BAND CONTENT

This is a write-only register, but its contents can be read for checking its proper programming.

Register Address

| A4 | A3 | A2 | A1 | A0 |
|---|---|---|---|---|
| 1 | 0 | 1 | 0 | 1 |

3.1.2.6 Freeze Registers

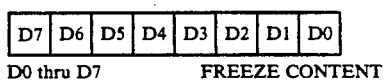

D0 thru D7      FREEZE CONTENT

This is a group of two register pairs: one pair for the near end, and one pair for the far end.
The data LSB, D0, is the first received bit.
The registers are read-only.

Register Address

| A4 | A3 | A2 | A1 | A0 | |
|---|---|---|---|---|---|
| 1 | 0 | 1 | 1 | 0 | NEAR LSB |
| 1 | 0 | 1 | 1 | 1 | NEAR MSB |
| 1 | 1 | 0 | 0 | 0 | FAR LSB |
| 1 | 1 | 0 | 0 | 1 | FAR MSB |

3.1.2.7 Broadcast Register

Register Address

| A4 | A3 | A2 | A1 | A0 |
|---|---|---|---|---|
| 1 | 1 | 1 | 1 | 1 |

This is a read-only register. When addressing this register, the register will send eight "0" (D0 thru D7) only when either of the following conditions, or both, were identified: FAR TX NEG LOS or FAR TX POS LOS. In other cases, the component will not respond to the request and will not connect to the serial bus (SB) during the second byte interval.

3.1.2.8 BPV Register

This register contains 16 bits, which indicate the count of Bipolar Violations (BPV).

The software can read this register by reading its sections:

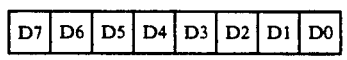

Register addresses are:

| A4 | A3 | A2 | A1 | A0 | |
|---|---|---|---|---|---|
| 1 | 1 | 0 | 1 | 0 | LSB BYTE |
| 1 | 1 | 0 | 1 | 1 | MSB BYTE |

D0 is the LSB of the counter.

3.1.2.9 Hardware Revision Register

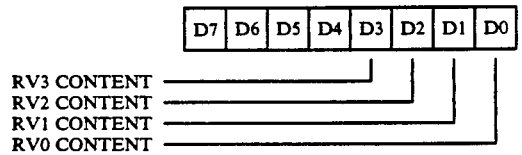

RV3 CONTENT
RV2 CONTENT
RV1 CONTENT
RV0 CONTENT

This is a read-only register. D4 thru D7 are not used.

Register Address

| A4 | A3 | A2 | A1 | A0 |
|---|---|---|---|---|
| 1 | 1 | 1 | 0 | 1 |

3.1.2.10 Command Register 4

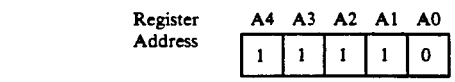

"0" DPLL WITH SELECTOR
"1" DPLL WITHOUT SELECTOR
"0" FDL DISABLE
"1" FDL ENABLE
"0" BPV REMOVAL AMI
"1" BPV REMOVAL B8ZS
"0" BPV REMOVAL DISABLE
"1" BPV REMOVAL ENABLE
"0" UNFRAMED QRSS
"1" FRAMED QRSS

FRAME FORMAT    :SF   0   0
                       ESF   0   1
                       SF   1   0
                       ESF ZBTSI   1   1
"0" NEAR P.M           (SEL 13)
"1" FAR P.M

This is a write-only register, but its contents can be read for checking its proper programming.

Register Address

| A4 | A3 | A2 | A1 | A0 |
|---|---|---|---|---|
| 1 | 1 | 1 | 1 | 0 |

3.1.2.11 QRSS Register

The component contains a 16-bit counter that counts QRSS errors. The software can read this counter by reading two registers:

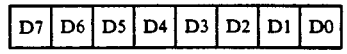

Register addresses are:

```
A4 A3 A2 A1 A0
 0  0  0  0  0   LSB BYTE
 0  0  0  0  1   MSB BYTE
```

D0 is the LSB of the counter.

3.1.2.12 Zero Counter Register

The component contains is a 16-bit counter that counts the number of zeroes. The software can read this counter by reading two registers:

```
D7 D6 D5 D4 D3 D2 D1 D0
```

Register addresses are:

```
A4 A3 A2 A1 A0
 0  0  0  1  0   LSB BYTE
 0  0  0  1  1   MSB BYTE
```

D0 is the LSB of the counter.

3.1.2.13 Frame Error (FE) and CRC Registers

The component contains a 9-bit CRC error counter and a 4-bit FE synchronization error counter. The software can read these counters by reading two registers:

```
MSB BYTE                       LSB BYTE
D7 D6 D5 D4 D3 D2 D1 D0     D7 D6 D5 D4 D3 D2 D1 D0
    FE COUNTER                  CRC COUNTER
```

Register addresses are:

```
A4 A3 A2 A1 A0
 0  0  1  0  0   LSB BYTE
 0  0  1  0  1   MSB BYTE
```

D0 of the LSB BYTE register is the LSB of the CRC counter.
D0 of the MSB BYTE register is the MSB of the CRC counter.
D1 of the MSB BYTE register is the LSB of the FE counter.

3.1.2.14 Loss-of Frame (LOF) Register

The component contains a 10-bit counter for LOF. The software can read the eight MSBs of the counter from a register.

```
D7 D6 D5 D4 D3 D2 D1 D0
```

Register Address
```
A4 A3 A2 A1 A0
 0  0  1  1  0
```

3.1.2.15 SF Yellow Alarm Register

The component contains an 8-bit counter for computing yellow alarms during SF operation. The software can read this counter by reading a register.

```
D7 D6 D5 D4 D3 D2 D1 D0
```

Register Address
```
A4 A3 A2 A1 A0
 0  0  1  1  0
```

D0 is the LSB of the counter.

3.1.2.16 Performance Monitor (PM) Status Register

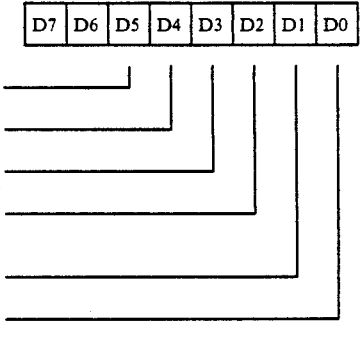

```
D7 D6 D5 D4 D3 D2 D1 D0
```
- B8ZS detection "1" / else "0"
- detection of 16 consecutive zero "1" / else "0"
- 2/6 errors in F bits "1" / else "0"
- yellow alarm detection "1" ESF / else "0"
- double sync "1" / else "0"
- OOF "1" / else "0"

This is a read-only register. Reading its contents resets all the flags.

Register Address
```
A4 A3 A2 A1 A0
 0  1  0  0  0
```

During reading, D6 and D7 are "0".

3.1.2.17 Unused Addresses

The following addresses must not be addressed by the software, because they are intended for component testing only. During normal operation, the data in these addresses will be "0".

| A4 | A3 | A2 | A1 | A0 |
|----|----|----|----|----|
| 0  | 1  | 0  | 0  | 1  |
| 0  | 1  | 0  | 1  | 0  |
| 0  | 1  | 0  | 1  | 1  |
| 0  | 1  | 1  | 0  | 0  |
| 0  | 1  | 1  | 0  | 1  |
| 0  | 1  | 1  | 1  | 0  |
| 0  | 1  | 1  | 1  | 1  |
| 1  | 0  | 0  | 0  | 0  |
| 1  | 1  | 1  | 0  | 0  |

3.2 Block Code Encoder (BCE)

A positive pulse will be identified as a MARK only if it stays "1" for six consecutive rising edges of the HFCLK signal. Narrower pulses will not be broadened by the BCE.

The BCE uses pulse width modulation for transfer of ternary signals on a single line.

Using the BCE, a position pulse on the RPOS line will be encoded as a pulse having a width of 7 HFCLK cycles. A positive pulse on the RNEG line will be encoded as a pulse having a width of 17 HFCLK cycles. Zeroes are encoded as zeroes. To reduce the end-to-end system generated jitter, and maintain it to less than 0.125 UI in the frequency range of 10 Hz to 30 kHz, the BCE will not add jitter and therefore it will transparently transmit the rising edges on the RPOS and RNEG lines. This, however, introduces an uncertainty of 1 HFCLK cycle, therefore the widths of the encoded pulses will be 7–8 and 17–18 HFCLK cycles, respectively. In case the RPOS and/or RNEG lines are stuck to '1', the BCE will not transfer the '1' to the equipment side; instead, it will generate '0' continuously at the output corresponding to the line continuously receiving '1'. The other output will operate as usual.

3.3 Block Code Decoder (BCD)

The BCD receives a pulse width modulated signal. The BCD converts the input signal to three signals, according to the input pulse width. The output signals of the BCD are regenerated by means of the HFCLK clock signal, thereby generating pulses having a width of 12 HFCLK clock pulses at the TPOS and TNEG output. The decoding criteria for the TPOS and TNEG output lines are as follows:

1. If during a pulse interval, the input pulse is sampled less than 3 times by the HFCLK clock, both the TPOS and the TNEG output lines assume '0' logic levels.
2. If during a pulse interval, the input pulse is sampled at least 3 times, but not more than 12 times, by the HFCLK clock, the TPOS line assumes an '1' logic level, and the TNEG line assumes a '0' logic level.
3. If during a pulse interval, the pulse is sampled at least 13 times, but not more than 29 times, by the HFCLK clock, the TPOS line assumes a '0' logic level, and the TNEG line assumes an '1' logic level.
4. If during a pulse interval, the pulse is sampled more than 30 times by the HFCLK clock, the TPOS line assumes a '0' logic level, and the TNEG line assumes an '1' logic level.

In order to distinguish between two input pulses, the HFCLK signal shall sample at least one '0' between both pulses.

When using this decoding method, the worst-case generated jitter is 0.0417 UI, because the input signal is sampled by the HFCLK clock 24 times faster than the rate of the received information. The resulting end-to-end system generated jitter is less than 0.125 UI.

In order to prevent premature detection of the end of the pulse when noise appears during the '1', and to prevent the start of a new pulse, a lockout interval is started after the BCD detects one pulse: the BCD is blocked for an interval of 14 HFCLK pulses. During this interval, the detection of a new pulse is not allowed.

If a pulse having a duration of at least 30 HFCLK pulses is received, this indicated that the near end equipment generated a KEEP ALIVE signal. The near end equipment generates this signal when LOS was detected while the operating mode is RX TRANSPARENT and NOT AUTO AIS NEAR END.

In such cases, the BCD circuit provides '0' logic signals to the TPOS and TNEG outputs. In order to prevent the POS/NEG LOS detectors to identify a LOS condition during the transfer of the KEEP ALIVE signal, the BCD generates a signal that prevents both LOS detectors from detecting a LOS condition.

3.4 LOS Detector

3.4.1 NEAR RX LOS (AL2)

This is a Bellcore detector. LOS is declared after 175±25 consecutive '0' bits appeared at the RPOS/RNEG inputs. This circuit is implemented by a counter clocked by the RCLK clock that counts the MARKs. Each MARK appearing on the line resets the counter. Only if no MARK signal was received during 175 RCLK pulses, the counter reaches its terminal count and indicates a LOS condition at the input. The LOS indication bit is stored in the alarm register (D5='1').

The criteria for exiting from the LOS condition is an average MARK density of 12.5% on the line, provided that not more than 15 consecutive '0' bits appeared on the line. In order to ensure that the data sequence will include not less than 12.5% MARKs, and to take into consideration that the frame synchronization bits are predetermined and cannot be changed, the LOS detector will actually exit the LOS state at a MARK density of 12.4%.

The circuit is implemented by three counters. One counter opens a window during 193 bits. A second counter counts the MARKs appearing on the line during this window. A third counter counts the '0' bits. If 16 consecutive '0' bits are counted, the 193-bit window will be opened again and the MARK counter will be reset and then will start counting. At the end of the window, the contents of the MARK counter counting are checked: if it counted at least 24 MARKS, the input exited from the LOS state.

The window always starts during a MARK time interval. If during the window interval, the conditions allowing exit from the LOS state were not detected, the following window will be opened on the first MARK appearing after the previous window was closed.

3.4.2 NEAR P/S H/L DETECT (AL3)

This detector can be connected to the primary or secondary output on the equipment side.

The condition for LOS declaration is the detection of at least 255 consecutive bits at the same level. This circuit is implemented by a counter that is reset on each level transition. If no level transitions are detected, the counter advances until it reaches a count equivalent to 255 bits, and then it locks. In this case, the detector declares the LOS.

The criteria for exiting from the LOS condition is the reception of alternating levels, that will reset again the counter.

3.4.3 FAR P/S H/L DETECT (AL4)

This detector can be connected on the primary or secondary input from the equipment side. This is a low frequency (750 kHz) activity detector.

The condition for LOS declaration is the absence of level transitions for 16 750 kHz clock periods.

This circuit is implemented by a counter that opens a window.

The counter is reset and starts advancing again when a level transition is received on the line. If no level transitions appear and the window ends, the counter locks freezes and LOS is declared.

The criteria for exiting from the LOS state is the detection of level transitions at the detector input.

3.4.4 FAR TX POS/NEG LOS (AL0, AL1)

The detector is located at the component input on the far end side. This detector separately identifies LOS conditions on the TPOS and TNEG outputs.

LOS is declared on the TPOS or on the TNEG line is detected if during a time interval of 255 bit intervals, no POS or NEG pulse was received.

A filter at the detector input transfers level transitions to the output, provided that the different level was sampled for at least 4 HF consecutive intervals.

The filter output signal is applied to the PWM detector that detects the POS or NEG pulses and resets the 225-bit counters accordingly.

A pulse sampled during 5 to 10 HFCLK pulses is considered as an input POS pulse.

A pulse sampled during 15 to 20 HFCLK pulses is considered as a NEG input pulse.

A pulse sampled during 46 to 50 HFCLK pulses is considered as a KEEP ALIVE SIGNAL (KAS) signal, and is used to reset the two counters.

If during a time period of 255-bits, no NEG or POS pulses did appear, the detector enters the LOS state.

The criteria for exiting from the LOS state is the reception of POS or/and NEG pulses.

3.4.5 General

In each detector (unless otherwise indicated), a digital filter circuit is located at the input. The filter is implemented by a counter that passes only pulses having a duration of at least 2 HFCLK clock pulses.

The falling edges to logic '0' are also filtered, therefore a '0' level is considered a signal having a duration of at least two HFCLK clock signals (3 samplings).

The filtered signal is applied to the detector via a digital differentiator operating at the frequency of the HFCLK signal.

3.5 Generators

3.5.1 AIS Generator

The AIS generator can be connected towards the near end on the equipment side. The generator can also be connected at the far end towards the output.

An AIS transmission is a continuous bit sequence of '1', using RZ coding.

Figure 11:
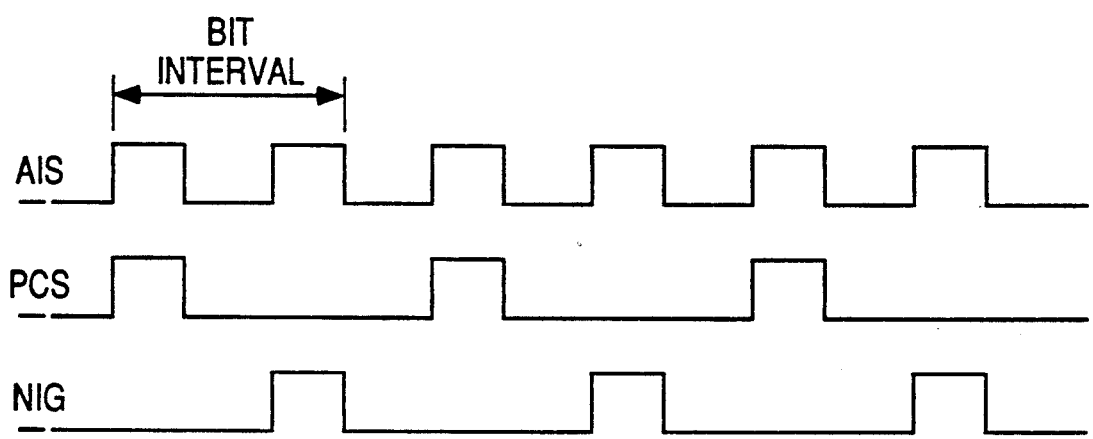

This signal is provided at the POS and NEG outputs, each of them alternately passing '1' logic pulse (MARK), as shown in FIG. 11.

In the TRANSPARENT and AUTO AIS NEAR SEND operating modes, the AIS signal is automatically generated at the near end 5 bit intervals after the NEAR RX LOS detector detects a LOS condition (command register No. 2, D0, D1, D4). The AIS is not generated automatically when bit D4 in the command register No. 2 is at logic '1'.

When the input exits from the LOS state, the AIS signal is deactivated and the far-end signal is connected instead.

When the component is in the FAR LOOP and AUTO AIS NEAR SEND modes, the AIS signal is not generated automatically; instead, the component transfers the information received from the far end.

3.5.2 QRSS Generator

This generator can be connected towards the near end on the equipment side. The generator can also be connected at the far end towards the transmit output.

The QRSS signal is provided on the TNEG and TPOS outputs, with '1' bits appearing alternately on each output line. RZ coding is used.

The output sequence is generated by a 20-bit shift register. The feedback is from stages 17 and 20 to the first stage of the register via an XOR gate. If outputs 6 thru 19 are at logic '0' or the output 20 is at logic '1', the output of the generator is at logic '1'.

In order to avoid freezing in the all-zero state, when all the outputs are at logic '0', an '1' bit is applied to the first stage.

The sequence operates in the following way.

$$Q_{N+1}(K+1) = Q_{20}(K) \quad N=1,2,\ldots 19$$
$$Q_1(K+1) = Q_{17}(K) \text{ XOR } Q_{20}(K)$$

$$RD(K) = Q_{20}(K) + Q_6(K) + Q_7(K) + \ldots Q_{19}(K)$$

where:
$Q_N(K)$—current state of stage N
$Q_N(K+1)$—next state of stage N
$RD(K)$—current state of output operator
XOR—LOGIC XOR operator
+—LOGIC OR operator

3.5.3 IN-BAND Generator

The IN-BAND generator can be connected towards the near end on the equipment side. The generator can also be connected at the far end towards the output.

The generator cyclically transmits an 8-bit word. The transmitted word can be programmed by means of the serial communication channel (in-band register). The LSB is transmitted first. The signal is RZ coded and is transmitted on the NEG and POS outputs, where '1' bits are alternately transmitted.

3.5.4 CLK GEN

This generator can be connected on the equipment side on the primary or secondary outputs. This generator provides a 750 kHz clock. The circuit is implemented by dividing the frequency of the HFCLK signal by 48.

3.5.5 KEEP ALIVE SIGNAL (KAS) Generator

When the component is simultaneously set to the 'NOT AUTO AIS NEAR SEND' mode, i.e. bit D4 in the command register No. 2 is '1', and to the RX TRANSPARENT mode, i.e. bits D0 and D1 in the command register No. 2 are '0', upon detection of the NEAR RX LOS condition the BCE provides a cyclic pulse sequence. The sequence consists of logic '1' for 48 HF clock pulses followed by logic '0' for 48 HF clock pulses. In addition, all the 16 flip-flops of the FREEZE register are reset to '0'.

When the NEAR RX LOS condition ends, the FREEZE registers are released and the BCE will provide POS and NEG output signals as described in para. 3.2.

When the component is in the RX AIS, the RX QRSS, or the RX IN BAND mode, the periodic KEEP ALIVE SIGNAL is not generated and the FREEZE registers are not reset.

When the component is in the FAR LOOP mode, detection of the NEAR RX LOS condition will not cause generation of the KAS signal and the information received from the TX side is transmitted instead the KAS signal.

3.6 Loops

The component includes five loop types:
FAR END LOOP: Connects the TX side to the RX side towards the equipment side, as near as possible to the line terminals (SEL1).
PRIMARY NEAR END LOOP: Connects the PRIMARY line output to the input, towards the line (SEL10).
SECONDARY NEAR END LOOP: Connects the SECONDARY line output to the input, towards the line (SEL12).
PRIMARY BRIDGE LOOP: Connects the PRIMARY line output to the input, towards the equipment side (SEL4).
SECONDARY BRIDGE LOOP: Connects the SECONDARY line output to the input, towards the equipment side (SEL6).

3.7 Freeze

The FREEZE mechanism is implemented by two 16-bit shift registers, one of them located at the near end, and the other located at the far end.

The shift register located at the near end transfers the information received from the line or from one of the following generators: QRSS, AIS, IN BAND.

The shift register located at the far end transfers the information received from the block code decoder. Both registers can be freezed by applying a logic '0' to their NFREEZE pins; their contents can then be read by the software for diagnostic purposes.

The clock used to load data in the registers is the data clock. For the near end register, the dock is the RCLK clock, the IN-BAND/QRSS/AIS clock or the TCLK (during the LOOP condition). The far end register uses the TCLK clock corresponding to the data received from the BCD.

3.8 RX Side Clock Recovery

The clock recovery circuit serving the near end uses a resettable counter. The recovered clock is used in the internal circuits (FREEZE, NEAR LOSS, etc.).

Figure 12:
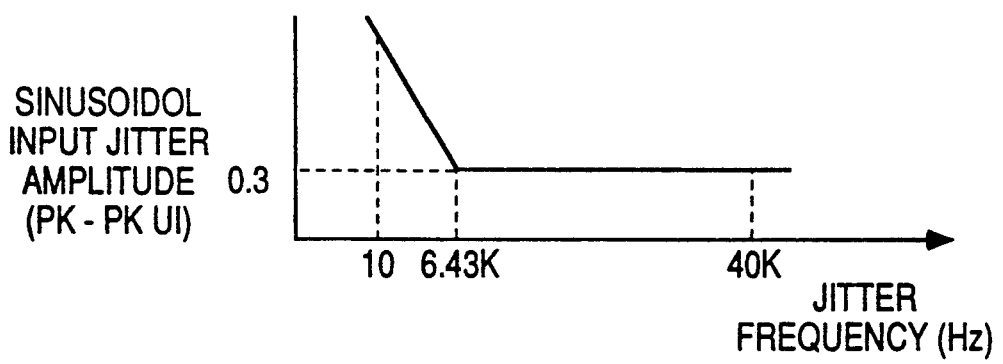

The clock recovery circuit can tolerate internal input jitter having the spectral characteristics as shown in FIG. 12.

Figure 13:
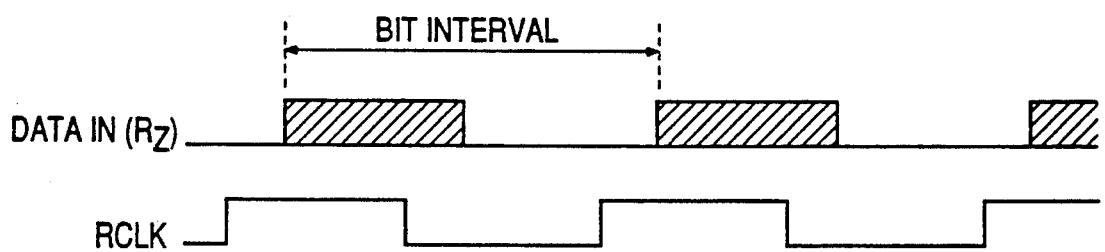

The component provides a regenerated receive clock signal, RCLK, as shown in FIG. 13.

The regenerated receive clock is used to sample the RPOS and RNEG inputs (by an external circuit) when 0.2 UI, 100 kHz input jitter is present.

3.3 TX Side Clock Recovery

The far-end clock recovery circuit uses a resettable counter. A DPLL circuit at the output of the resettable counter is used to filter the recovered clock, to obtain the specified end-to-end jitter transfer function of the component, as shown in FIG. 14.

The data passes via a ±8-bit FIFO (the data is delayed by the FIFO by 8 bit intervals, therefore the total interval delay of the component is 12 bit intervals). The FIFO input clock is the clock signal regenerated by the resettable counter.

The FIFO read-out clock is the smoothed clock signal provided by the DPLL.

The K counter is ±128 up/down counter that returns to zero after correction.

The I/D counter is a divider by 2. This counter adds or substracts one pulse under the control if the K counter.

The N counter divides the output signal of the I/D counter by 12 to provide a 1.544 MHz signal.

The comparison frequency is 96.5 kHz.

As a result of phase detector operation the phase difference between the DPLL input clock signal and the clock recovered by the DPLL is 180°.

These two clock signals are used FIFO write and read clocks. As a result during normal operation, the read time from the FIFO is delayed by 8 bit intervals with respect to the write time (i.e. the normal operation is around the center of the FIFO).

To reduce the probability of overshoot (that is, to avoid the condition, in which, after offsetting in one direction, an offset in the other direction will be required), a selector is used to shift the phase of the signals at the comparison frequency. The output will be corrected only if after the phase was already shifted, an offset in the same direction is still required. The purpose of this mechanism is to reduce the DPLL generated jitter.

It is possible to disable the selector circuit by asserting bit D7 in the command register 4 to logic '1'.

The DPLL transfer function has a pole at a frequency of 120 MHz.

Figure 15:
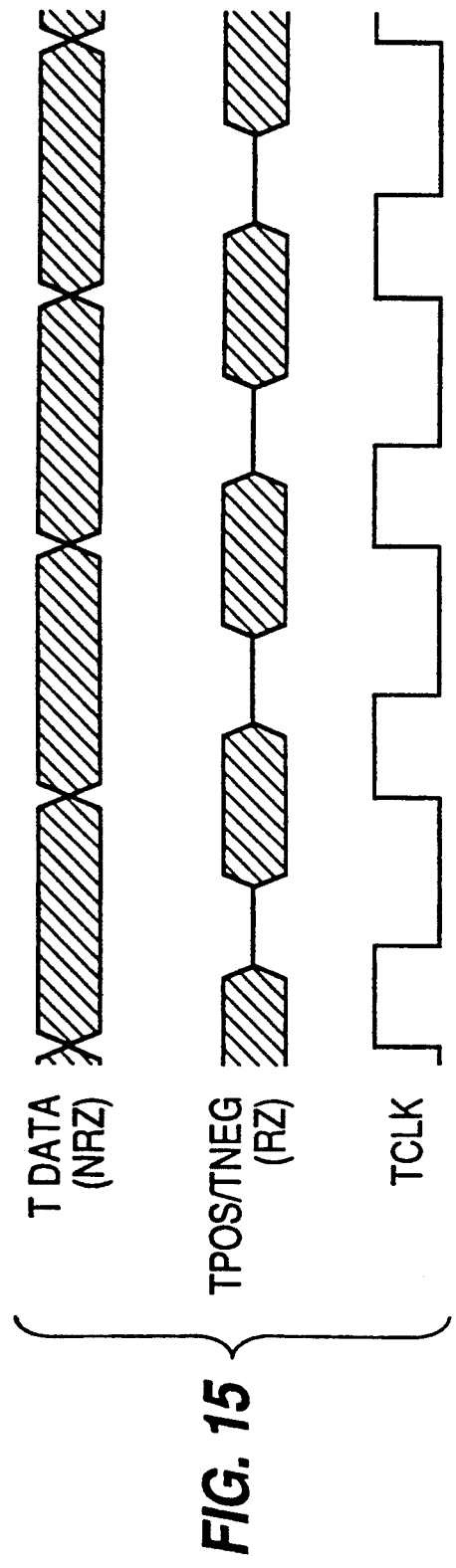

This circuit generates the TCLK transmit clock. This clock is provided at the output together with the TDATA. The TDATA signal is the NRZ coded transmit data, that is identical with the data transmitted on the TPOS and TNEG lines, as shown in FIG. 15.

The TCLK signal is used as the transmit clock when transmitting to the line the signal generated by the AIS, QRSS or IN-BAND generator. In this case, TDATA is the NRZ coded data signal.

3.10 HFCLK LOS

The HFCLK alarm (indicated by bit D2='1' in the alarm register) indicates that the HFCLK signal is missing.

This mechanism operates in the following way:

When the selected NCSA or NCSB input lines respectively, is at logic '1', an internal flip-flop is set.

When the component is selected and the NCS line is at logic '0', the flip-flop is released from the forced '1' state, and the HFCLK signal can clock the flip-flop and change its state. When the software reads this flip-flop, its state is '0' if the HFCLK signal is present and '1' when the HFCLK signal is missing.

3.11 Reset

The component has two reset options:
Via the NMR pin, by applying a logic '0' to this pin.
By the software (SOFT RESET), by loading '1' in bit D7 of the command register No. 3.

The following operations are performed during reset:
The SDOUT is programmed to the Hi Z state.
The phase selector will be inserted in the DPLL on the transmit side.
TPOS and TNEG are programmed to DISABLE.
FDLOUT and FDLCLK are programmed to DISABLE.
The serial communication is in the INPUT state.
The PM is programmed to NEAR.
LD is programmed to '0'.
The FRAME FORMAT is programmed to SF.
The BROADCAST operating mode is programmed to DISABLE.
The QRSS error counter is programmed to the UNFRAMED state.
Operating mode B8ZS is programmed.
The BPV correction mode is programmed to DISABLE.

In any case, the SOFT RESET will not reset the microprocessor interface, to avoid component lockout without possibilty to exit from this RESET state.

When a NMR reset is performed, then in addition to the normal reset operations, the SOFT RESET is enabled (D7 bit in command register No. 3 assumes logic '1').

When the SOFT RESET to present, read or write via the serial communication are not possible, except that bit D7 in the command register No. 3 can be written, to cancel the SOFT RESET state.

3.12 LSI Revision

Bits D0, D1 in the alarm and status register are forced to '0' and '1', respectively. These bits define the LSI revision.

3.13 Broadcast

This function enables the software to enquire simultaneously several components about the LOS state at the far end output (POS/NEG LOS). To enable this operating mode, a logic '0r30 shall be loaded in bit D5 in the command register No. 3.

When this operating mode is enabled, the BROADCAST register is addressed (address 11111) and a read command is applied to the BROADCAST register, the register will respond only when a FAR TX POS LOS or a FAR TX NEG LOS condition exists. The response consists of eight consecutive '0' bits transmitted on the serial bus. If the LOS alarm is similar to the bus condition for an unaddressed component is not present, the serial bus will remain in the INPUT condition.

When the broadcast mode is not enabled (bit D5 in command register No. 3 is '1'), on each addressing to the BROADCAST register in order to read its content, the bus will remain in the Hi-Z state, similar to the bus condition for an unaddressed component.

The purpose of this mechanism is to allow the software to block repeating LOS messages after a report on the LOS of a NEG or a POS line was already transmitted. Only after exiting from the LOS state will the software enable again the BROADCAST mode, in order to obtain indications of new LOS.

3.14 Output Port LD

It is possible to force the LD pin to '1' or logic '0', by means of bit D4 in the command register No. 3.

The state of the LD pin will be determined by with the contents of bit D4. In the RESET state, the LD pin is programmed to '0'. This pin is used to control a LED.

3.15 HFCLK Oscillator

This is an external oscillator (also including components external to the LSI, e.g. a crystal, etc.) that provides the HFCLK clock to all the LSI internal circuits. The highest operating frequency of the oscillator is 38 MHz.

3.16 Hardware Revision

Bits D0 thru D3 in the Hardware Revision register contain the contents hardwired to input line RV0 to RV3 accordingly. The software can read PCB revision by reading the contents of these bits.

3.17 Performance Monitor (PM)

The component includes a performance monitor for the DS1 line.

The PM mechanism can be connected at the near end or at the far end.

The selection between to the near end and the far end is by means of bit D0 in the command register No. 4.

Each transfer from the far end to the near end or vice-versa resets the PM mechanism.

3.17.1 Frame Format

The component operates in three frame format versions:
SF (FT/FS)
ESF
ESF ZBTSI

The selection of the frame format is performed by programming bits D1 and D2 in the command register No. 4.

3.17.1.1 SF (Super Frame) Format

TABLE 3.17A

| Frame Number | F-Bit Use | | Bit Use in Each Channel | | Signaling-Bit Use |
|---|---|---|---|---|---|
| | FT* | FS** | Data | Signaling | |
| 1 | 1 | — | Bits 1-8 | | |
| 2 | — | 0 | Bits 1-8 | | |
| 3 | 0 | — | Bits 1-8 | | |
| 4 | — | 0 | Bits 1-8 | | |
| 5 | 1 | — | Bits 1-8 | | |
| 6 | — | 1 | Bits 1-7 | Bit 8 | A |
| 7 | 0 | — | Bits 1-8 | | |
| 8 | — | 1 | Bits 1-8 | | |
| 9 | 1 | — | Bits 1-8 | | |
| 10 | — | 1 | Bits 1-8 | | |

TABLE 3.17A-continued

| Frame Number | F-Bit Use FT* | F-Bit Use FS** | Bit Use in Each Channel Data | Bit Use in Each Channel Signaling | Signaling-Bit Use |
|---|---|---|---|---|---|
| 11 | 0 | — | Bits 1-8 | | |
| 12 | — | 0 | Bits 1-7 | Bit 8 | B |

*Frame synchronization bits
*Super-frame synchronization bits (signaling)

The criteria for loss of synchronization is the detection of two FT bits in error out of four consecutive bits. The synchronization mechanism is a parallel synchronization mechanism that is implemented by a 386×4 RAM. A flowchart of this synchronization mechanism is shown in FIG. 16.

YELLOW ALARM COMPUTATION

In a super-frame, the YELLOW alarm is transmitted from end to end by forcing bit 2 of each time slot to logic '0'.

The component contains an eight-bit counter that counts '1' on bit 2 of each time slot. This counter is locked when all its stages assume logic '1'.

After each reading from the SF YELLOW ALARM register, the counter is reset and it starts counting again.

Before starting the calculation for the YELLOW ALARM, a dummy read must be performed in order to reset the counter.

3.17.1.2 ESF and ESF-ZBTSI Formats

ESF—extended super-frame
ZBTSI—zero byte time slot interleaving

CRC 6 Error Counter

In the ESF operating mode, the component counts CRC 6 errors. CRC computation is performed in the following way: The data polynom of the super-frame number N (the frame bits, F-BITS, are considered as '1' for this computation) is multiplied by $X^6$ and the polynom is divided by $X^6+X+1$.

The remainder is a 5th order polynom, represented by 6 bits. These 6 bits are compared with bits C1 thru C6 of frame N+1.

If the bits match, no CRC errors are declared. If the bits are different, at least one CRC error is present and the CRC error counter counts it.

The error counter is a 9-bit counter that is locked when it reaches the terminal count (all '1').

The software reads the contents of this counter in two bytes. The software reads first the least significant byte, that comprises 8 bits and then the most significant byte that comprises only one meaningful bit, the MSB.

After reading, the counter is reset.

Before starting the error report, a dummy read must be performed in order to reset the counter.

Yellow Alarm Computation

The component can detect yellow alarm in the ESF and the ESF ZBTSI frames. The yellow alarm information (the M bits in the super-frame) is transmitted via the data link. The transmission rate is 4 kHz for the ESF format, and 2 kHz for the ESF-ZBTSI format.

The yellow alarm information consists of a cyclic sequence comprising eight '1' followed by eight '0'

TABLE 3.17.1.2-A

| NUMBER | F-BIT USE FPS[1] | F-BIT USE FDL[2] | F-BIT USE CRC[3] | BIT USE IN EACH CHANNEL DATA | BIT USE IN EACH CHANNEL SIGNALING | SIGNALING-BIT USE 2 STATE | SIGNALING-BIT USE 4 STATE | SIGNALING-BIT USE 16 STATE |
|---|---|---|---|---|---|---|---|---|
| 1 | — | M | — | BITS 1-8 | | | | |
| 2 | — | — | C1 | BITS 1-8 | | | | |
| 3 | — | M | — | BITS 1-8 | | | | |
| 4 | 0 | — | — | BITS 1-8 | | | | |
| 5 | — | M | — | BITS 1-8 | | | | |
| 6 | — | — | C2 | BITS 1-7 | BIT 8 | A | A | A |
| 7 | — | M | — | BITS 1-8 | | | | |
| 8 | 0 | — | — | BITS 1-8 | | | | |
| 9 | — | M | — | BITS 1-8 | | | | |
| 10 | — | — | C3 | BITS 1-8 | | | | |
| 11 | — | M | — | BITS 1-8 | | | | |
| 12 | 1 | — | — | BITS 1-7 | BIT 8 | A | B | B |
| 11 | — | M | — | BITS 1-8 | | | | |
| 14 | — | — | C4 | BITS 1-8 | | | | |
| 15 | — | M | — | BITS 1-8 | | | | |
| 16 | 0 | — | — | BITS 1-8 | | | | |
| 17 | — | M | — | BITS 1-8 | | | | |
| 18 | — | — | C5 | BITS 1-7 | BIT 8 | A | A | C |
| 19 | — | M | — | BITS 1-8 | | | | |
| 20 | 1 | — | — | BITS 1-8 | | | | |
| 21 | — | M | — | BITS 1-8 | | | | |
| 22 | — | — | C6 | BITS 1-8 | | | | |
| 23 | — | M | — | BITS 1-8 | | | | |
| 24 | 1 | — | — | BITS 1-7 | BIT 8 | A | B | D |

[1]FPS - Synchronization sequence
[2]FDL - 4 kHz for ESF data link
 2 kHz for ESF ZBTSI data link
[3]CRC - Cyclic Redundancy Check The criteria for exit from synchronization is the detection of two FT bits in error out of four consecutive bits. The synchronization mechanism is a parallel synchronization mechanism that is implemented by a 772×4 RAM. A flowchart of this synchronization mechanism is shown in FIG. 17.

(1111111100000000).

The component sets a flag each time 17 consecutive yellow alarm sequences are identified. After the software reads this flag, the flag is reset.

FDLOUT and FDLCK Outputs

The component provides the FDL data and the FDL clock signals when enabled by the software (when '1' is loaded in bit D6 of the command register No. 4). The transmission rate is 4 kHz for the ESF format, and 2 kHz for the ESF-ZBTSI format.

The FDLOUT and FDLCLK outputs are open-drain outputs (without a diode to the supply line), to allow bus operation.

When the component is programmed to the FDL DISABLE state, it will not be connected to the bus.

Figure 18:
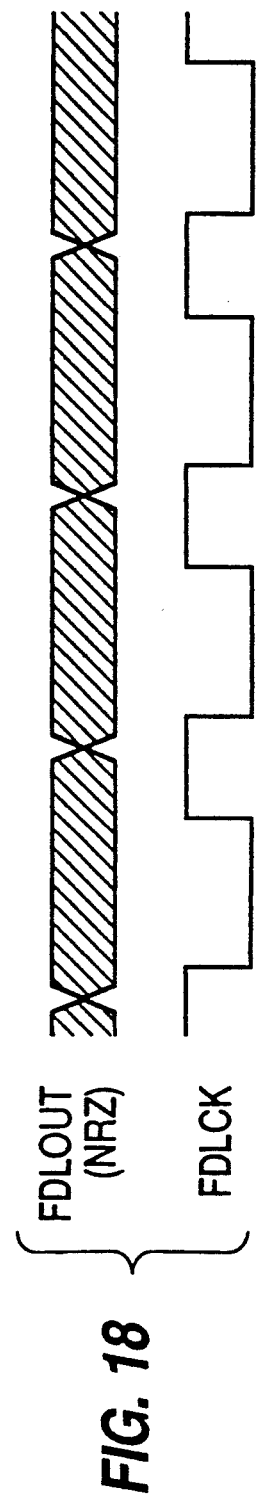

The purpose of the two signals is to enable remote performance monitoring, i.e. decoding of data passing via the FDL channel and reporting this data. The relationship between the FDL data, FDLOUT, and the FDL clock, FDLCLK, is shown in FIG. 18.

3.17.2 GENERAL Counter

The component contains several counters that count various events. The number of stages of these counters was selected so that for a line error rate of $10^{-3}$, readings for PM purposes will be required once per second.

All these counters are locked when all their outputs reach state '1'. It is possible to read counter state by reading the contents of one or two registers, depending on the number of stages of the addressed counter. Reading resets the counter.

When reading from a-counter that has more than 8 bits, i.e. a counter that requires reading from two registers, the program must first read the least significant byte, and then must immediately read the most significant byte.

Before starting a monitoring operation whose results depend on the count accumulated in a counter, a dummy read must be performed, to reset the counter. This state is characterized by 193 bit frames.

3.17.2.1 QRSS Counter

The component comprises a 16-bit counter that counts the QRSS errors. The state of the counter can be read by reading two bytes.

The component can operate in two modes:
1. UNFRAMED QRSS
2. FRAMED QRSS

The QRSS sequence is defined in para. 3.5.2.

In the UNFRAMED QRSS mode, the component continuously checks QRSS errors on all the bits (synchronization bits do not exist and QRSS information is received instead).

In the FRAMED QRSS mode, QRSS information is received in all the bits, with the exception of the synchronization bits. When a synchronization bit is received, the information is not checked and the counter stops, so that practically a frame QRSS with 192 bits is received.

The QRSS mechanism is defined as out-of-sync when the 16-bit counter reaches the FFFFH count. In this state, the loop opens and the shift register that generates the reference sequence will be loaded. The circuit remains in this state until the counter will exits the FFFFH state. This will occur when the software reads a byte from the counter.

After the counter exits the FFFFH state, the loop closes and the generation of the reference sequence is started. The reference sequence is compared with the received sequence and the differences between them are counted by the counter.

3.17.2.2 BPV Counter

The component contains a 16-bit counter that counts the bipolar coding violations (BPV). The software can read the state of this counter by means of two bytes.

The BPV counter will count each coding violation when it is programmed to the AMI mode (a coding violation occurs when two consecutive pulses have the same polarity).

When the counter is programmed to the B8ZS mode, it will count all the coding violations, with the exception of the B8ZS code (000+ −0− + when the previous pulse was positive, or 000− − +0+ − when the previous pulse was negative). In such a case, the counter will not count the two B8ZS coding violations.

3.17.2.3 ZERO Counter

The component contains a counter that counts the zeroes. The software can read the state of this counter by means of two bytes. The counter is used to compute the ALARM INDICATION signal (AIS).

3.17.2.4 FRAME ERROR (FE) Counter

The component contains a 4-bit counter that counts the errors detected in the synchronization sequence. The software can read the state of this counter by means of one byte. In the SF (FT/FS) mode, the counter counts the FT errors. In the ESF or ESF ZBTSI mode, the counter counts the FPS errors.

3.17.2.5 LOSS OF FRAME (LOF) Counter

The component contains a 10-bit counter that counts the number of the super frames that were synchronized during the time interval that passed from the previous reading. The software can read the eight MSBs from the counter by reading one byte. When reading a byte, only the register that contained the byte is reset (the two LSB bits are not reset).

The counter is used for RED alarm computation.

A long integration can be performed and the timings of entry and exit to/from the RED state can be computed from the number of super-frames that are synchronized per second.

3.17.3 FLAGS

The component contains several flags that are set when a certain event occurs. All the flags appear in the PM STATUS register. The software shall read the status of the flags every second. The flag will be reset when the software reads it, i.e. when the software reads the PM register.

3.17.3.1 OOF FLAG

This flag will be set when loss of sequence occurs. When the system regains synchronization, the flag remains set until the software reads it, and then it is reset. If during flag reading, the system is not yet synchronized, the flag is set again immediately after the reading, in order to report on the following reading that a OOF state occurred.

3.17.3.2 Double Synchronization Frame Flag

When the system searches the synchronization, and more than one synchronization candidate exists, the double synchronization frame flag is set.

3.17.3.3 ESF YELLOW ALARM Flag

This flag indicates YELLOW alarm detection in the ESF or ESF ZBTSI operating modes.

3.17.3.4 'Two-of-Six Synchronization Errors' Flag

The component will lose synchronization when errors are detected in 2 out of 4 consecutive synchronization bits.

In order to warn about excessive errors in the synchronization sequence, the component contains a flag that is set when errors are detected in 2 out of 6 bits of the synchronization sequence.

3.17.3.5 16 ZEROES Flag

Since only 15 consecutive zeroes are allowed on the line, this flag will be set when 16 consecutive zeroes are detected.

3.17.3.6 B8ZS Flag

The component comprises a flag that indicates the detection of a B8ZS code. The B8ZS code is represented by a $000+-0-+$ sequence when the previous pulse was positive, or a $000-+0+-$ sequence when the previous pulse was negative.

BIPOLAR VIOLATION (BPV) Correction

The component has a BPV correction mode.

BPV correction is performed at the far end. Bit 4 in the command register No. 4 is programmed to enable this operating mode. The correction is performed in accordance with the line coding method:

When AMI coded data appears on the line, i.e. when bit D5 in the command register No. 4 is '0', each code violation will be corrected.

When B8ZS data appears on the line, i.e. when bit D5 in the command register No. 4 is '1', all the code violations will be corrected, with the exception of the violations that represent a group of eight zeroes in the B8ZS code (codes $000+-0-+$ when the previous pulse was positive and code $000-+0+-$ when the previous pulse was negative, will not be corrected and will be transparently passed).

In this operating mode, the B8ZS-coded data is delayed by four additional bit intervals (at the 1.544 MHz clock pulses) in its path towards the TPOS/TNEG output.

TECHNOLOGY

The component is implemented using 1.5 micron standard CMOS cell technology.

The maximum operating frequency of the component is 38 MHz. The following inputs are Schmitt trigger inputs: NTEST, NMR, NFREEZE, ANB, RPOS, RNEG.

The SDOUT−/SDOUT+ output is a symmetric balanced RS422 output.

The PDIN/SDIN input is a CMOS input.

The SDA0 and SDB0 outputs are open-drain outputs with 8 mA drive capability. These outputs do not have protection diodes to the supply line.

The FDLOUT and FDLCLK outputs are open-drain, with 5 mA drive capability outputs. These outputs do not have voltage protection diodes to the supply line.

TIMING

Figure 19:
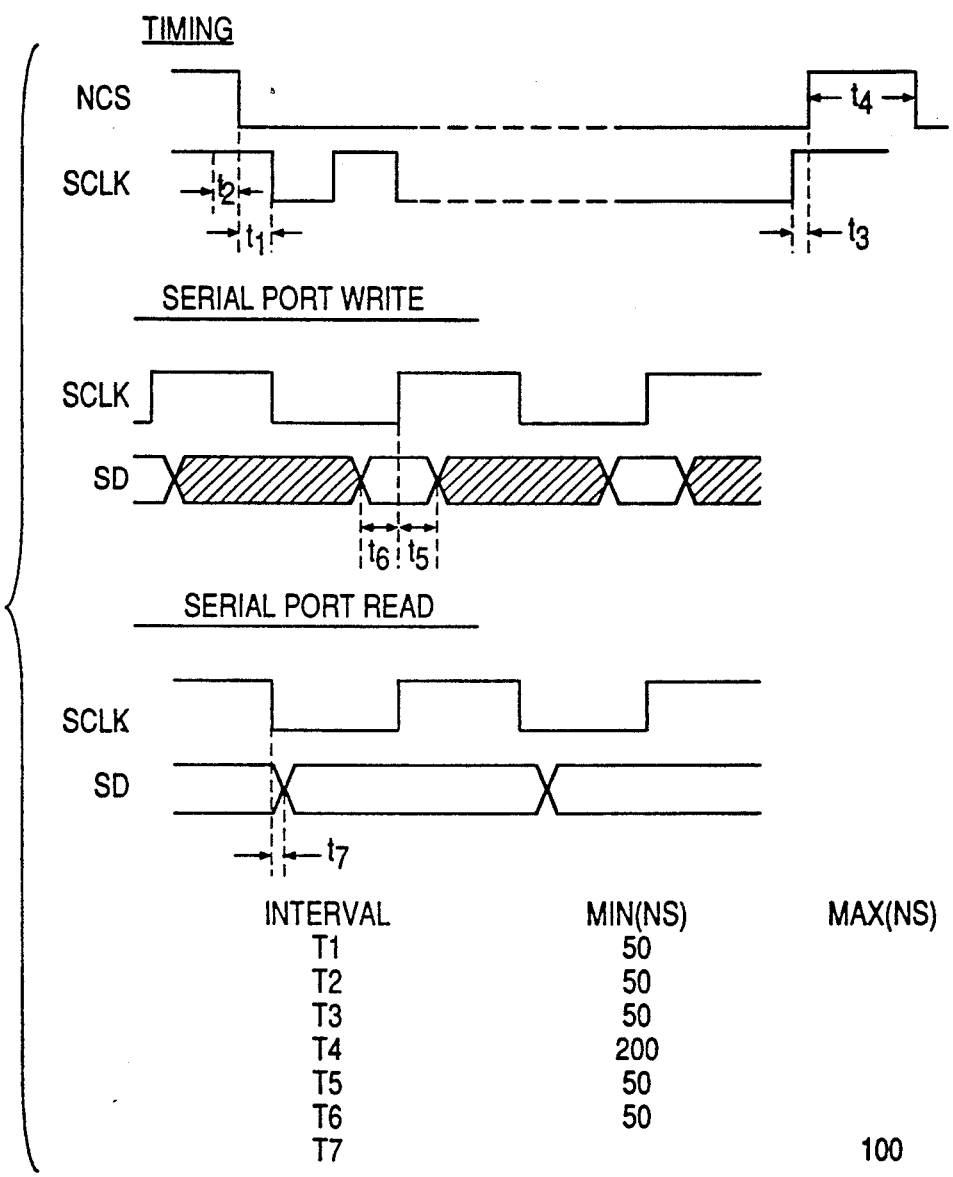

A timing diagram for the P LINT showing the timing for the serial port write and read operations is shown in FIG. 19.

As mentioned above, FIG. 20 is an expanded block diagram version of FIG. 10. In this figure, the location of the various elements set forth in the previous functional description are illustrated in more depth. In FIG. 20, like numerals to FIG. 10 denote like elements.

FIG. 21 illustrates the fundamental LSI matrix building block, herein referred to as MTX, of the switching network 10. Each terminal switching unit TSU shown in FIG. 5 preferably includes eight of the units MTX, while each of the intermediate switching units ISU preferably includes eight of the MTX units (although this is, of course, not limiting to the present invention). Each MTX can include 35 inputs and 35 outputs, together with 35 multiplexors MUX to perform the actual crosspoint switching. Each multiplexor MUX is controlled through the control unit 12 so that a particular one of the inputs to the switching matrix array MTX can be connected to a particular one of its outputs. In this way, a non-blocking crosspoint matrix can be achieved.

More specifically, as shown in FIG. 21, 35 input lines $I_0$–$I_{34}$ are each coupled to the 35 multiplexor MUX circuits. Each of the multiplexor circuits, in turn, provides an output (respectively, $O_0$–$O_{34}$). Control registers 40 provide control of the multi-plexors MUX to determine which of the 35 inputs $I_0$–$I_{34}$ is coupled to which of the output lines $O_0$–$O_{34}$. The control registers 40 are, in turn, controlled by the control unit 12 through the microprocessor interface 42. In this arrangement, the switching matrix has a typical transmission delay of less than 15 microseconds. It is also capable of connection types of two-way crosspoint, one-way crosspoint and broadcast.

The MTX communicates with a microcontroller of the control unit 12 via a serial communication channel coupled to the up interface 22. The serial communication channel comprises four lines:

SCLK—1.5 MHz serial communication clock
NCS—select signal for the addressed MTX
SDI—serial data bus input
SDO—serial data bus output Communication takes place only when the MTX receives both the SCLK and NCS signals. FIG. 22 shows a waveform diagram of these signals.

The information for communication contains 2 bytes of eight bits each. The first byte is a write-only byte to the MTX. The second byte can be read or write, in accordance with the state of the R/W bit.

R/W="1": Read output; the serial bus serves as an output from the component
R/W="0": Write output; the serial bus serves as an input to the component
A0–A5: Address of internal MTX register which must be addressed for reading/writing the data during the second byte
Bit 7: Always "0", otherwise the MTX will not be addressed
D0–D5: Data to be written into/read from the component
D6, D7: "Don't care" during writing The LSB of the data or the address is transmitted/received first, that is, the A0 or D0 bit is transmitted and received first. When the bus is operated in the input mode, it will sample the SD on the rising edge of the SCLK signal. When the bus is operated in the output mode, it will sample the SD on the falling edge of the SCLK signal.

A description and mapping of the internal registers of the MTX will now be provided.

a. Matrix Registers

|   | D5 | D4 | D3 | D2 | D1 | D0 |
|---|----|----|----|----|----|----|
| CONNECT TO I0 | 0 | 0 | 0 | 0 | 0 | 0 |
| CONNECT TO I1 | 0 | 0 | 0 | 0 | 0 | 1 |
| CONNECT TO I2 | 0 | 0 | 0 | 0 | 1 | 0 |
| | | | | | | |
| CONNECT TO I31 | 0 | 1 | 1 | 1 | 1 | 1 |
| CONNECT TO I32 | 1 | 0 | 0 | 0 | 0 | 0 |
| CONNECT TO I33 | 1 | 0 | 0 | 0 | 0 | 1 |
| CONNECT TO I34 | 1 | 0 | 0 | 0 | 1 | 0 |
| CONNECT TO CLKGEN | 1 | 0 | 0 | 0 | 1 | 1 |
| CONNECT TO "0" | 1 | 0 | 0 | 1 | 0 | 0 |
| | 1 | 0 | 1 | 1 | 1 | 1 |
| OUTPUT TRISTATE | 1 | 1 | X | X | X | X |

Register Addresses

| A5 | A4 | A3 | A2 | A1 | A0 |    |
|----|----|----|----|----|----|----|
| 0  | 0  | 0  | 0  | 0  | 0  | Matrix Register 0 |
| 0  | 0  | 0  | 0  | 0  | 1  | Matrix Register 1 |
| 1  | 0  | 0  | 0  | 1  | 0  | Matrix Register 34 |

These registers are write-only registers.

b. All H/L Control Register

|   | D5 | D4 | D3 | D2 | D1 | D0 |
|---|----|----|----|----|----|----|
| CONNECT TO O0 | 0 | 0 | 0 | 0 | 0 | 0 |
| CONNECT TO O1 | 0 | 0 | 0 | 0 | 0 | 1 |
| CONNECT TO O2 | 0 | 0 | 0 | 0 | 1 | 0 |
| | | | | | | |
| CONNECT TO O31 | 0 | 1 | 1 | 1 | 1 | 1 |
| CONNECT TO O32 | 1 | 0 | X | X | 0 | 0 |
| CONNECT TO O33 | 1 | 0 | X | X | 0 | 1 |
| CONNECT TO O34 | 1 | 0 | X | X | 1 | 0 |
| CONNECT TO CLKGEN | 1 | 0 | X | X | 1 | 1 |
| CONNECT TO "D3" | 1 | 1 | X | X | X | X |

| A5 | A4 | A3 | A2 | A1 | A0 |   |
|----|----|----|----|----|----|---|
| 1  | 0  | 0  | 0  | 1  | 1  | Register Address |

This register is write or read. While in reading D6 and D7 will be "0".

c. General Register

| D7 | D6 | D5 | D4 | D3 | D2 | D1 | D0 |
|----|----|----|----|----|----|----|----|

0 LSI REVISION
0 LSI REVISION
0 LSI REVISION
LSCK "1" LOSS OF CKIN
     "0" ELSE
LSDT "1" ALL H/L DETECT
     "0" ELSE
"1" BROADCAST
"0" NORMAL

| A5 | A4 | A3 | A2 | A1 | A0 |   |
|----|----|----|----|----|----|---|
| 1  | 0  | 0  | 1  | 0  | 0  | Register Address |

This register is write for D2 and read for D2÷D7. D0 and D1 will be "0".

d. Bank Registers

The bank registers are used to enable reading the matrix programming. In order to read matrix routing information, a matrix read operation must be performed. The data read from the matrix register comprises eight bits. Each bit indicates the status of one input (I0 thru I7): connected to the output, or disconnected. The second operation is the loading of four additional registers, such that each bit represents one input: therefore, by reading the four registers, it is possible to determine which input is connected to an output.

| D7 | D6 | D5 | D4 | D3 | D2 | D1 | D0 | A5 | A4 | A3 | A2 | A1 | A0 |
|----|----|----|----|----|----|----|----|----|----|----|----|----|----|
| C7 | C6 | C5 | C4 | C3 | C2 | C1 | C0 | MATRIX REGISTER ||||||
| C15 | C14 | C13 | C12 | C11 | C10 | C9 | C8 | 1 | 0 | 0 | 1 | 0 | 1 |
| C23 | C22 | C21 | C20 | C19 | C18 | C17 | C16 | 1 | 0 | 0 | 1 | 1 | 0 |
| C31 | C30 | C29 | C28 | C27 | C26 | C25 | C24 | 1 | 0 | 0 | 1 | 1 | 1 |
| 0 | 0 | CTS | CT0 | CCG | C34 | C33 | C32 | 1 | 0 | 1 | 0 | 0 | 0 |

-continued

CI (I = 0 thru 34) — Connect to I
CCG — Connect to CLKGEN
CT0 — Connect to "0"
CTS — Output in TRI-STATE condition Example: Output 2 is connected to input 15. To check this, the contents of matrix register No. 2 (000010) are read. This results in groups of eight zeroes. In the second step, the contents of the four registers are read, the bits read from the registers are "0", except for C15 and CTS, that are "1".

e. Broadcast Registers

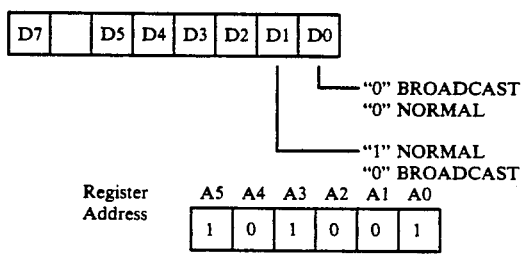

This register is write-only for bits D0 and D1, but its contents can be read for testing register programming. During read operations, eight are transferred. Bits D2 thru D7 are always "0".

f. Unused Addresses

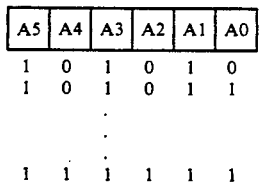

During read operations and unused addresses, all the data bits, D0 thru D7, will be "1". If the information bits read from a component are all "1", either an addressing error occurred (read operation from an unused address), or there is some malfunction, because during normal operation registers which are in used will never return an all-ones reply.

As mentioned previously, the control unit 12 for the EDSX can basically be designed as a 3-level control arrangement with a high level controller HLC (which may be an external unit), a main control processor MCP, and peripheral control units formed with terminal control units TCU and switching control units SCU. FIGS. 23-29 illustrate the connection of these three levels of control, taking into account redundancy architecture to improve the survivability of the system in the face of malfunctioning problems. Controls A and B are provided at the MCP and the PCU levels to ensure continuous operation if any malfunction occurs.

Figure 30:
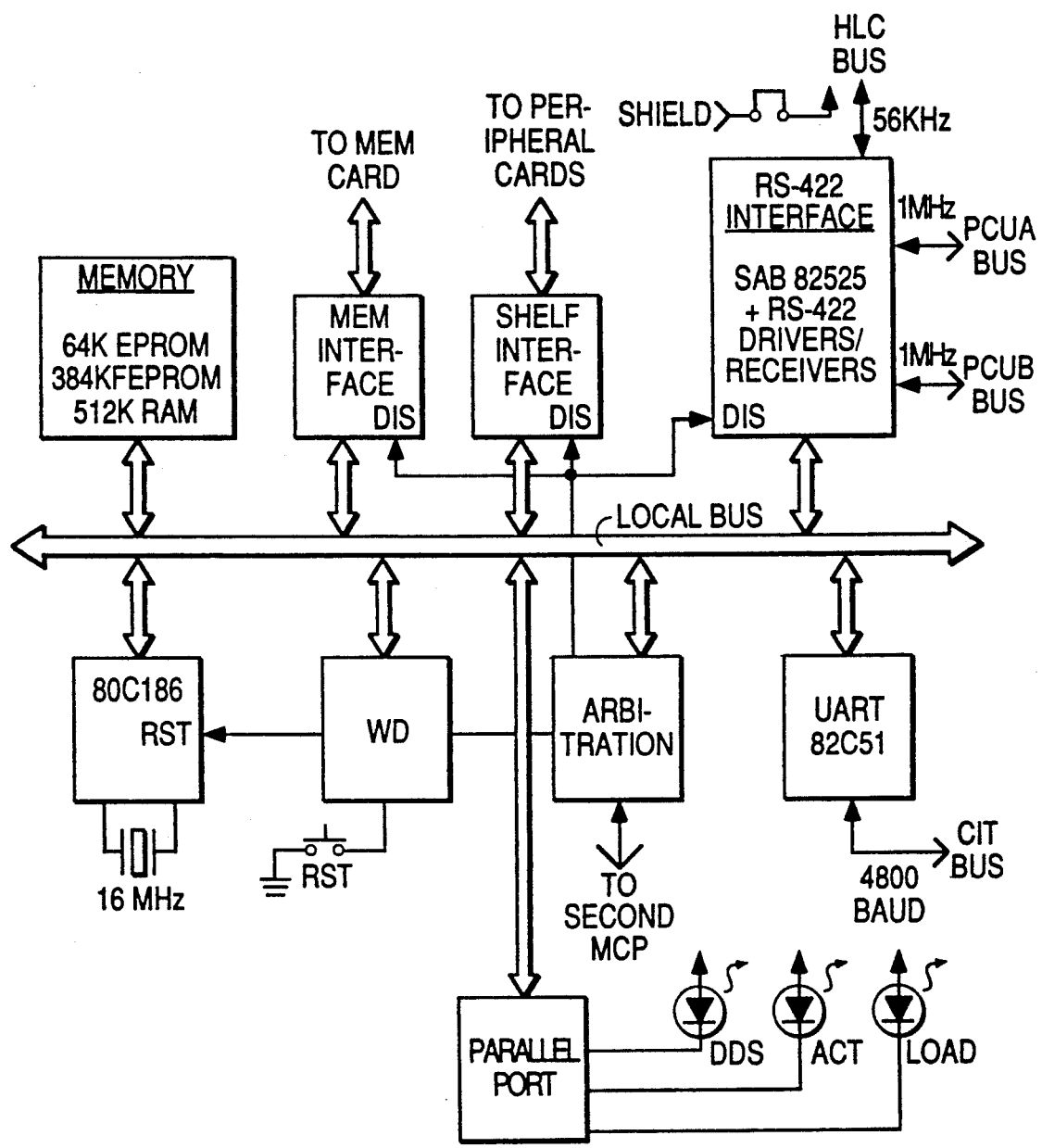
Figure 31:
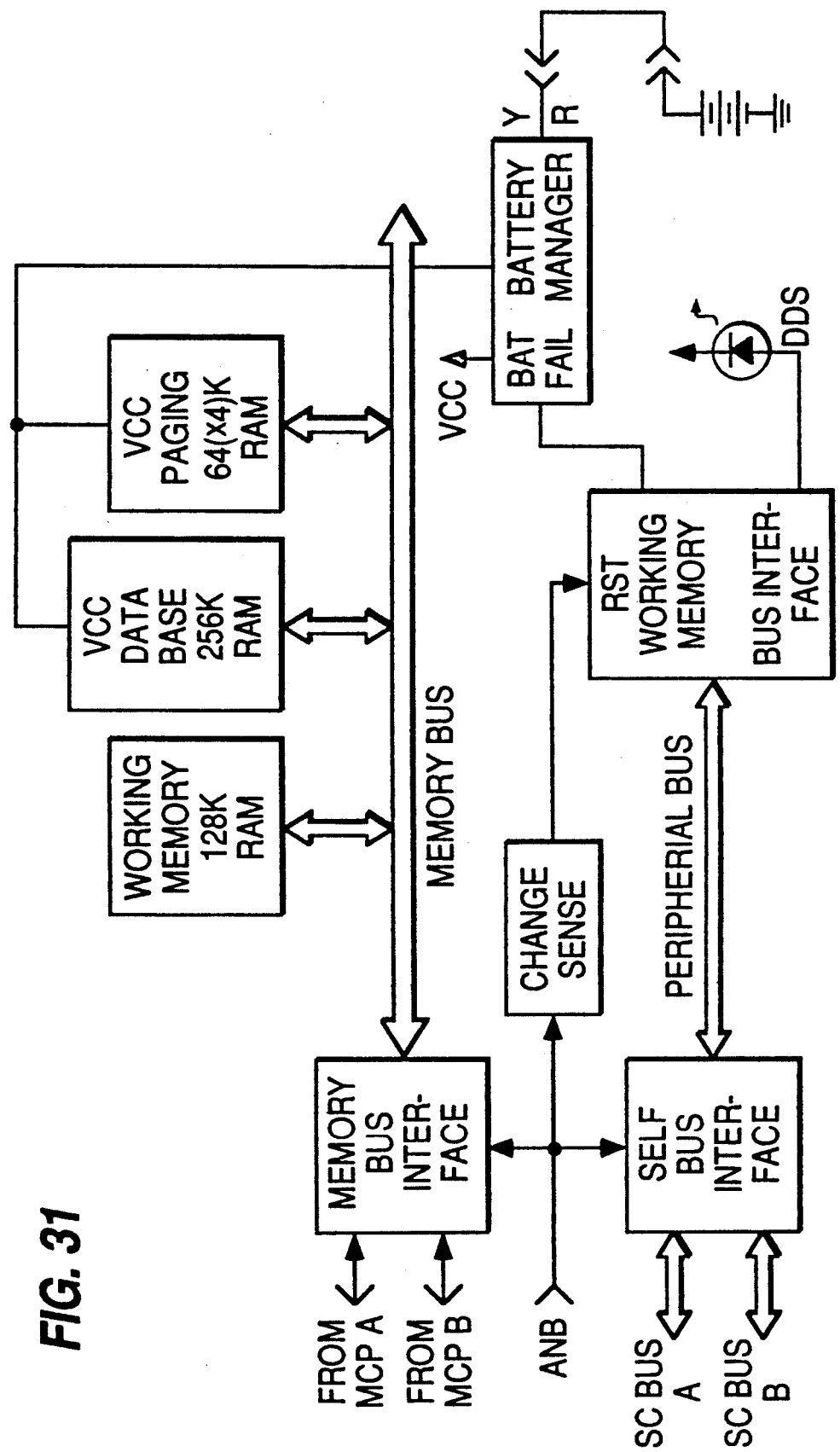
Figure 32:
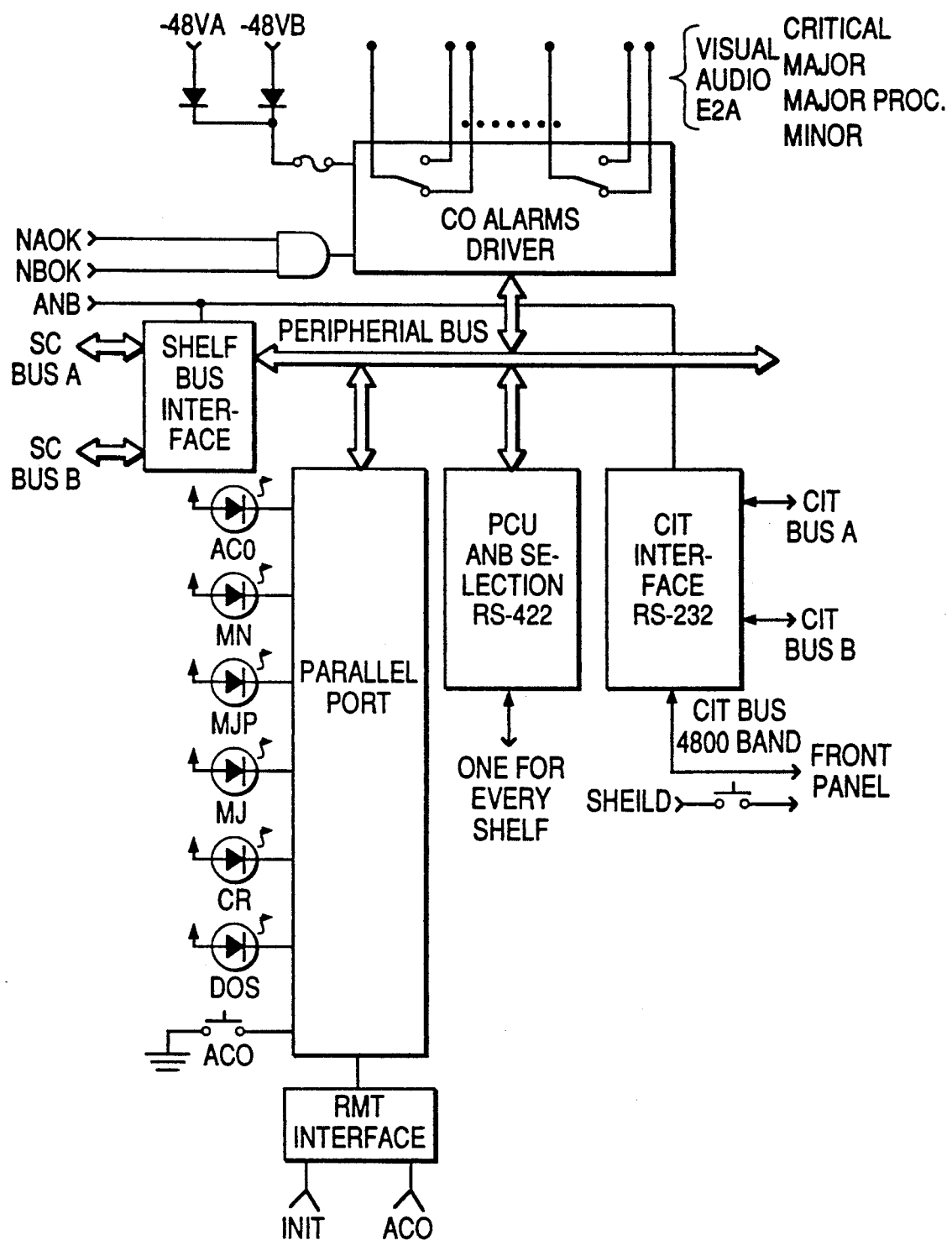
Figure 33:
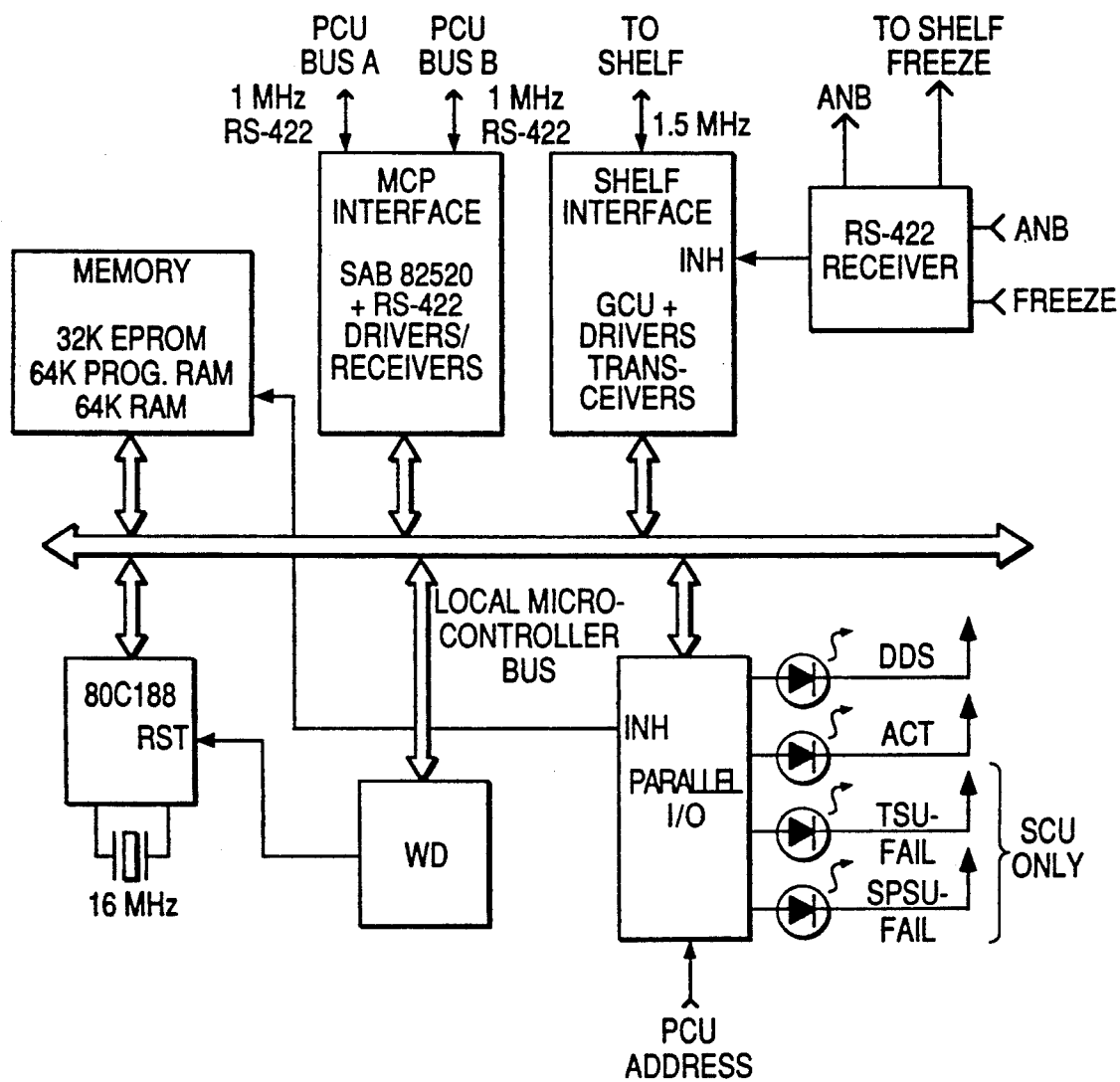

FIGS. 30-33 are block diagrams showing further details of the elements of the redundancy system shown in FIG. 23. More specifically, FIG. 30 shows a suitable construction for either of the main control processors of FIG. 23. FIG. 31 shows an arrangement that can be used for the memory of FIG. 23. FIG. 32 shows an arrangement for an alarm interface unit AIU. Finally, FIG. 33 shows an arrangement for the peripheral control units PCU in FIG. 33.

It should be noted that FIG. 34 shows a global control unit GCU which couples the peripheral control units such as TCU and SCU to the actual ESDX elements (for example, the P LINT, MTX or S LINT). This GCU serves to convert the TCU/SCU parallel bus to a serial bus.

FIG. 34 shows a general block diagram of the global control unit GCU. As can be seen there, this GCU includes a 3 to 8 decoder 50, a chip select block 52, a serial communication block 54 and a control block 56. FIGS. 35, 36 and 37 show timing diagrams for the operation of this global control unit GCU.

The GCU can be constructed as a 68 PLCC device with the following pin-out arrangement:

| Pin No. | Pin Name | I/O | Comments |
|---|---|---|---|
| | NCS | I | Selects specific device for parallel communication. |
| | A0:A2 | I | Address for internal register selection. |
| | NRD | I | Read signal for parallel communication. |
| | NWR | I | Write signal for parallel communication. |
| | RDY | O | Ready output, active only when the device is selected. High level indicates that the device is ready for parallel communication. |
| | D0:D7 | I/O | Parallel control and data bus. |
| | NS0:NS27 | O | 28 outputs to select which device is active on the serial bus. |
| | NPM | O | When low, the serial bus is granted to the performance monitoring devices. |
| | SD0:SD6 | I/O | 6 serial data buses. |
| | RMW | O | Indicates if the serial data buses are inputs or outputs. |
| | SCLK | O | Serial bus clock, the clock frequency is the crystal frequency divided by four. |
| | SCLKD | O | Serial clock delayed signal. SCLK delayed one internal clock period. |
| | SCLCKIN | I | Serial clock input signal. This clock is used to read the serial bus. |
| | XTAL1 | I | Crystal, or external clock input. |
| | XTAL2 | O | Crystal input. |
| | G0:G3 | O | General purpose outputs. Follow the value of D0:D3 in register 5. |
| | E0:E1 | O | Enable signals for external transceivers. |
| | NRST | I | Rest input, resets all internal registers and sets all input/output pins to inputs. |
| | VDD | I | 5 Volts input. |
| | VSS | I | Ground input. |

4. FUNCTIONAL DESCRIPTION

The GCU is controlled by a microprocessor from the Intel 51, 88, or 188 families through its eight bit parallel data bus. Six registers control the GCU operation, the desired register address is indicated by A0:A2.

Every transaction through the GCU serial bus, involves two bytes: an eight bits address byte, that includes a read/write bit and an eight bits data byte.

4.1 PARALLEL BUS

The parallel bus includes the following signals:
Eight bits data bus that enables the processor to read from and write to the internal registers (DO:D7).
Three address pins to select the register (A0,A1,A2).
Chip select, read and write pins (NCS,NRD,NWR).
Ready output that may be connected to the ARDY pin of the 188 family controllers, for wait states insertions (RDY).

4.1.1 INTERNAL REGISTERS

The GCU includes six internal registers named register 0 to register 5.

REGISTER 0

Register 0 contains the address of the LSI that will be granted the serial bus, a bit that controls the NPM pin, and a bit that indicates the broadcast condition.
D0:D4—LSI address, 0 to 27.
D5—NPM pin.
D6—If set, broad cast mode is enabled.
D7—Reserved; must be 0.

REGISTER 1

Register 1 contains the internal register address of the LSI that was granted the serial bus; as well as a read/write bit that indicates if the LSI internal register must be read from or written to.

Every write to this register will cause the GCU to address the LSI specified in Register 0 for a serial transaction.

After a write to this register, the GCU will be not ready for 18*(SCLK period), e.g. for a crystal frequency of 6 Mhz the GCU will not be ready for 12 microseconds.
D7—Must be 0.
D6:D1—Six LSI internal registers address bits
D0—Read/write bit. "1" whenever the controller wants to read the LSI's internal register.

REGISTER 2

Register 2 contains the data to be written to the LSI's internal register specified in Register 1, for a write operation. This register may be read by the controller also.

REGISTER 3

Register 3 contains the data that was read from the LSI's internal register specified in Register 1, for a read operation; D6 is the MSB and D0 the LSB. For broadcast operations, each bit of this register contains the "logic and" of the results of the broadcast operation for the respective serial data bus, e.g. D0 will contain the result of SD0, D1 of SD1, and so on; D7 will always be "1".

REGISTER 4

Register 4 is a general purpose control register.
D7:D6—Reserved. Must be written as "0".
D5—Ready control. When "low" the RDY output will be active. A "high" level will disable the RDY output.
D2:D4—GCU version number.
D1—RDY bit. When "high" indicates that the GCU is ready for parallel communication. Not masked by ready control (D5).
D0—Clock alarm. When high indicates that the device's clock is inactive.

REGISTER 5

Register 5 is the general purpose pins status register.
D7:D4—Reserved. Must be written as "0".
D3—G3 status bit. Output G3 follows the value of this pin.
D2—G2 status bit. Output G2 follows the value of this pin.
D1—G1 status bit. Output G1 follows the value of this pin.
D0—G0 status bit. Output G0 follows the value of this pin.

4.2 Serial Bus

The serial bus includes the following signals:
28 chip selects (NS0:NS27).
Another chip select that, together with the 28 chip selects, enables to reach 56 devices (NPM).
7 serial data buses, (SD0:SD6).
Two serial clock outputs (SCLK and SCLKD), and one serial clock input (SCLKIN).
A Read/Write signal that indicates wheter the serial bus is operating as an input, or as an output; enables to control external tranceivers (RNW, normaly low, unless the SD bus is an input).
2 transceivers enable signals that follow the value of D0 and D1 of register 0.

SERIAL BUS OPERATION (D6 of register 0 low state)

The serial bus operation starts with a write operation to register 1. After the write operation is compleated, the GCU will force a low state to the NSn pin, where "n" is the number indicated by D0:D4 of register 0, NPM will already be stable and in accordance with D5 bit of register 0. The GCU will then output the eight bits of register 1 (LSB first), and then, if D0 of register 1 is "0", the GCU will output the eight bits of register 2 (LSB first) through SDm pin where m=INT[n/4]; and if D0 of register 1 is "1", the GCU will force the RNW pin high, and input to register 3 eight bits (LSB first) through SDm pin in accordance with SCLKIN. For every bit, input or output, the GCU will produce a clock pulse in the SCLK and SCLKD pin. After the operation is compleated, the GCU will force high the NSn pin, and the RNW pin low.

The RDY pin will output a low state, when the GCU is addressed through the parallel bus, from the moment that a write operation is performed to register 1, and until the serial bus transaction is compleated.

BROADCAST MODE (D6 of register 0 high state)

The broadcast option is provided to enable the fast scanning of the whole hardware connected to the GCU in one serial bus cycle.

The controller will write "7F" to register 0, then it will write to register 1; in response to the write to register 1 the GCU will force all NSn pins low, and perform a read operation. Every bit of register 3 will contain the result of the read operation for its respective serial bus, eg. D0 will contain the result for the SD0 bus, D1 for the SD1 bus and so on. After the read operation is compleated all NSn pins will be forced high and the RNW will be forced low. The controller may then read the result from register 3.

If the devices attached to the GCU force the serial bus low when they have an alarm state, and remain in tri-state if they have no alarms to report, the controller must only read one byte to know if any device attached to the GCU is alarming.

4.3 Other Functions

The GCU includes also a clock divider, a clock monitor, four general purpose outputs, and a reset function.

INTERNAL CLOCK

The GCU internal clock may be provided by a crystal connected between XTAL1 and XTAL2 input pins, or by an external clock source connected to XTAL1 pin. The GCU will will divide it by 4 to produce the SCLK and SCLKD signals.

The GCU monitors its internal clock, if there were no clock pulses between two controller read operations of register 4, then D0 of register 4 will go high. Note that for this bit to be valid, at least one internal clock period must elapse between both read operations.

The SCLKIN input is the read clock for the serial bus whenever the GCU wants to read information.

GENERAL PURPOSE PINS

G0:G3 are general purpose output pins that are controlled by D0:D3 of register 5. This pins may be used to indicate an alarm condition, to open and close buffers, or for other applications.

RESET FUNCTION

The reset function may be performed by forcing the NRST pin low. The GCU will reset all its internal registers, force NSn pins high, and remain in this state until the NRST pin goes high.

4.4 BLOCK DIAGRAM (FIG. 84)

A block diagram of the GCU is showed in FIG. 84. This block diagram is divided into for main blocks:
Three to eight decoder.
Chip select block.
Serial communication block.
Control block.

THREE TO EIGHT DECODER 50

This decoder enables one of the seven internal registers in accordance with A0:A2, and only if NCS is low.

CHIP SELECT BLOCK 52

This block handles the information included in register 0. It forces low one out of 28 NSn lines in accordance with D0:D4 for the time needed to perform the serial communication; it outputs the value of NPM; and in broadcast mode it forces all NSn pins low for the time needed to perform the broadcast function.

After a serial communication took place the NSn pins are always forced high.

D0 and D1 of register 0 are forwarded to pins E0 and E1.

SERIAL COMMUNICATION BLOCK 54

This block contains registers 1, 2 and 3; whenever a write operation is performed to register 1 a serial bus transaction will take place as described before. This block outputs the RNW signal to indicate when the SDn pins are transmitting data and when receiving data.

In the broadcast mode this block will build the answer byte from SD0:SD6.

CONTROL BLOCK 56

This block handles the information received from registers 4 and 5, as well as it provides the timing for the GCU; it includes the oscilator for crystal operation; and it generates the SCLK signal.

5. TECHNOLOGY

The GCU is a semicustom gate array CMOS LSI. The maximum frequency within this device is 8 Mhz. All inputs have CMOS levels.

6. TIMING

Timing waveforms are given in FIG. 35 and FIG. 36, and are in accordance with the values in the following table:

| INTERVAL | MIN | MAX | UNITS |
|---|---|---|---|
| t1 |  | 50 | ns |
| t2 | 100 |  | ns |
| t3 | 0 | 20 | ns |
| t4 | 10 |  | ns |
| t5 | 100 |  | ns |
| t6 | 10 |  | ns |
| t7 |  | 15 | ns |
| t8 | 450 |  | ns |
| t9 | 120 |  | ns |
| t10 | 120 |  | ns |
| t11 | 120 |  | ns (note 1) |
| t12 | 100 |  | ns |
| t13 | 100 |  | ns |
| t14 |  | 100 | ns |
| t15 | 0 | 250 | ns |
| t16 |  | 20 | ns |

Note 1: SCLK and SCLKD must remain in high state until NSn goes high.

In summary, the present invention provides an EDSX which is capable of directly replacing the conventional manual DSX. Due to the particular construction of the EDSX of the present invention, it is transparent to bipolar violations in the bipolar AMI 3-level input signals. It is also capable of direct control from outside the system, and includes performance monitoring features. As further discussed herein, arrangements are provided for attenuating jitter, and control provisions are made for redundancy to ensure survivability of the system.

It is to be understood that the above-described arrangements are simply illustrative of the application of the principles of this invention. Numerous other arrangements may be readily devised by those skilled in the art which embody the principles of the invention and fall within its spirit and scope.

We claim:

1. An electronic digital signal cross-connect system comprising:
a plurality of input terminals for respectively receiving bipolar 3-level input signals having a predetermined bit rate;
a plurality of output terminals for respectively providing bipolar 3-level output signals having said predetermined bit rate as outputs of said cross-connect system;
an interface circuit having an input section coupled to said input terminals to receive said plurality of bipolar 3-level input signals and having an output section coupled to said output terminals to output said bipolar 3-level output signals, wherein said input section includes means for converting said bipolar 3-level input signals into predetermined coded signals and wherein said output section includes means for converting said predetermined coded signals into said bipolar 3-level output signals;

a digital switching network having a plurality of inputs coupled to receive said predetermined coded signals from said input section of said interface circuit and having a plurality of outputs coupled to provide said predetermined coded signals to said output section of said interface circuit, wherein said digital switching network includes a plurality of switching units for coupling said plurality of inputs with said plurality of outputs; and control means coupled to said digital switching network for controlling said switching units to couple at least a predetermined one of said inputs of said digital switching network to a predetermined one of said outputs of said digital switching network to provide a connection path through said switching matrix for at least one of said predetermined coded signals between said predetermined one of said inputs and said predetermined one of said outputs, wherein at least one of said input terminals will be cross-connected to at least one of said output terminals through said interface circuit and said digital switching network to provide a bipolar 3-level output signal at said at least one output terminal corresponding to a predetermined bipolar 3-level input signal at said at least one input terminal which bipolar 3-level output signal will include any bipolar violations which may exist in said predetermined bipolar 3-level input signal.

2. An electronic digital signal cross-connect system according to claim 1, wherein said predetermined coded signals are coded using a pulse width modulation code.

3. An electronic digital signal cross-connect system according to claim 2, wherein said input section of said interface circuit includes means for converting positive levels of said bipolar 3-level input signals into pulses of a first level having a first predetermined width in said coded signals, means for converting negative levels of said bipolar 3-level input signals into pulses of said first level having a second predetermined width, greater than said first predetermined width, in said coded signals, and means for maintaining a zero level of said bipolar 3-level input signals as a zero level in said coded signals.

4. An electronic digital signal cross-connect system according to claim 1, wherein said output section of said interface circuit includes a decoder for decoding said predetermined coded signals into binary signals, a digital phase lock loop for attenuating jitter in said binary signals, and means for converting said binary signals into said bipolar 3-level output signals.

5. An electronic digital signal cross-connect system according to claim 1, wherein said interface circuit includes means for monitoring predetermined characteristics of said input signals.

6. An electronic digital signal cross-connect system according to claim 1, wherein said digital switching network is a pure space switching network.

7. An electronic digital signal cross-connect system according to claim 1, wherein said bipolar 3-level input signals and said bipolar 3-level output signals are time-division multiplexed signals.

8. An electronic digital signal cross-connect system according to claim 7, wherein said bipolar 3-level input signals and said bipolar 3-level output signals are first hierarchy digital signals (DS1).

* * * * *